US011695795B2

(12) United States Patent
Hadar et al.

(10) Patent No.: US 11,695,795 B2
(45) Date of Patent: Jul. 4, 2023

(54) EVALUATING EFFECTIVENESS OF SECURITY CONTROLS IN ENTERPRISE NETWORKS USING GRAPH VALUES

(71) Applicant: Accenture Global Solutions Limited, Dublin (IE)

(72) Inventors: Eitan Hadar, Nesher (IL); Dani Grabois, Tel Aviv-Jaffa (IL)

(73) Assignee: Accenture Global Solutions Limited, Dublin (IE)

( * ) Notice: Subject to any disclaimer, the term of this patent is extended or adjusted under 35 U.S.C. 154(b) by 196 days.

(21) Appl. No.: 16/925,583

(22) Filed: Jul. 10, 2020

(65) Prior Publication Data

US 2021/0014265 A1 Jan. 14, 2021

Related U.S. Application Data

(60) Provisional application No. 62/873,530, filed on Jul. 12, 2019.

(51) Int. Cl.
*H04L 9/40* (2022.01)
(52) U.S. Cl.
CPC ................ *H04L 63/1433* (2013.01)
(58) Field of Classification Search
CPC ............... H04L 63/1433; H04L 63/205; G06F 2221/2139; G06F 21/577
See application file for complete search history.

(56) References Cited

U.S. PATENT DOCUMENTS 5,521,910 A 5/1996 Matthews
6,279,113 B1 8/2001 Vaidya
(Continued)

FOREIGN PATENT DOCUMENTS

EP 1559008 8/2005
EP 1768043 3/2007
(Continued)

OTHER PUBLICATIONS

Abraham et al. "A Predictive Framework for Cyber Security Analytics Using Attack Graphs." International Journal of Computer Networks & Communications (IJCNC). vol. 7, No. 1, Jan. 2015. (Year: 2015).*
(Continued)

*Primary Examiner* — Sarah Su
(74) *Attorney, Agent, or Firm* — Fish & Richardson P.C.

(57) ABSTRACT

Implementations are directed to an agile security platform for enterprise-wide cyber-security and performing actions of receiving, from an agile security platform, analytical attack graph (AAG) data representative of one or more AAGs, each AAG representing one or more lateral paths within an enterprise network for reaching a target asset from one or more assets within the enterprise network, determining, for each instance of a plurality of instances of the AAG, a graph value representing a measure of hackability of the enterprise network at respective times, providing a profile of the enterprise network based on a set of graph values determined for instances of the AAG, the profile representing changes in graph values over time, determining an effectiveness of one or more security controls based on the profile, and selectively executing one or more remedial actions in response to the effectiveness.

18 Claims, 6 Drawing Sheets

(56) References Cited

U.S. PATENT DOCUMENTS

| | | |
|---|---|---|
| 6,487,666 B1 | 11/2002 | Shanklin et al. |
| 7,540,025 B2 | 5/2009 | Tzadikario |
| 7,703,138 B2 | 4/2010 | Desai et al. |
| 7,904,962 B1 | 3/2011 | Jajodia et al. |
| 8,099,760 B2 | 1/2012 | Cohen et al. |
| 8,176,561 B1 | 5/2012 | Hurst et al. |
| 8,656,493 B2 | 2/2014 | Capalik |
| 8,881,288 B1 | 11/2014 | Levy et al. |
| 9,166,997 B1 | 10/2015 | Guo et al. |
| 9,256,739 B1 | 2/2016 | Roundy et al. |
| 9,563,771 B2 | 2/2017 | Lang et al. |
| 9,633,306 B2 | 4/2017 | Liu et al. |
| 9,992,219 B1 | 6/2018 | Hamlet et al. |
| 10,084,804 B2 | 9/2018 | Kapadia et al. |
| 10,291,645 B1 | 5/2019 | Frantzen et al. |
| 10,382,473 B1 | 8/2019 | Ashkenazy et al. |
| 10,447,721 B2 | 10/2019 | Lasser |
| 10,447,727 B1 | 10/2019 | Hecht |
| 10,601,854 B2 | 3/2020 | Lokamathe et al. |
| 10,642,840 B1 | 5/2020 | Attaluri et al. |
| 10,659,488 B1 | 5/2020 | Rajasooriya et al. |
| 10,771,492 B2 | 9/2020 | Hudis et al. |
| 10,848,515 B1 | 11/2020 | Pokhrel et al. |
| 10,868,825 B1 | 12/2020 | Dominessy et al. |
| 10,873,533 B1 | 12/2020 | Ismailsheriff et al. |
| 10,956,566 B2 | 3/2021 | Shu et al. |
| 10,958,667 B1 | 3/2021 | Maida et al. |
| 11,038,900 B2 | 6/2021 | Jusko et al. |
| 11,089,040 B2 | 8/2021 | Jang et al. |
| 11,128,654 B1 | 9/2021 | Joyce et al. |
| 11,159,555 B2 * | 10/2021 | Hadar ............... H04L 63/1433 |
| 11,184,385 B2 | 11/2021 | Hadar et al. |
| 11,232,235 B2 * | 1/2022 | Hadar .................. G06F 21/577 |
| 11,277,431 B2 | 3/2022 | Hassanzadeh et al. |
| 11,281,806 B2 | 3/2022 | Hadar et al. |
| 11,283,824 B1 | 3/2022 | Berger et al. |
| 11,283,825 B2 | 3/2022 | Grabois et al. |
| 11,411,976 B2 | 8/2022 | Basovskiy et al. |
| 11,483,213 B2 | 10/2022 | Engelberg et al. |
| 11,533,332 B2 | 12/2022 | Engelberg et al. |
| 2005/0138413 A1 | 6/2005 | Lippmann et al. |
| 2005/0193430 A1 | 9/2005 | Cohen et al. |
| 2006/0037077 A1 | 2/2006 | Gadde et al. |
| 2008/0044018 A1 | 2/2008 | Scrimsher et al. |
| 2008/0289039 A1 | 11/2008 | Rits et al. |
| 2008/0301765 A1 | 12/2008 | Nicol et al. |
| 2009/0077666 A1 | 3/2009 | Chen et al. |
| 2009/0138590 A1 | 5/2009 | Lee et al. |
| 2009/0307772 A1 | 12/2009 | Markham et al. |
| 2009/0319248 A1 | 12/2009 | White et al. |
| 2010/0058456 A1 | 3/2010 | Jajodia et al. |
| 2010/0138925 A1 | 7/2010 | Barai et al. |
| 2010/0174670 A1 | 7/2010 | Malik et al. |
| 2011/0035803 A1 | 2/2011 | Lucangeli Obes et al. |
| 2011/0061104 A1 | 3/2011 | Sarraute Yamada et al. |
| 2011/0093916 A1 | 4/2011 | Lang et al. |
| 2011/0093956 A1 | 4/2011 | Laarakkers et al. |
| 2013/0097125 A1 | 4/2013 | Marvasti et al. |
| 2013/0219503 A1 | 8/2013 | Amnon et al. |
| 2014/0082738 A1 | 3/2014 | Bahl |
| 2014/0173740 A1 | 6/2014 | Albanese et al. |
| 2015/0047026 A1 | 2/2015 | Neil et al. |
| 2015/0106867 A1 | 4/2015 | Liang |
| 2015/0199207 A1 | 7/2015 | Lin et al. |
| 2015/0261958 A1 | 9/2015 | Hale et al. |
| 2015/0326601 A1 | 11/2015 | Grondin et al. |
| 2015/0350018 A1 | 12/2015 | Hui et al. |
| 2016/0105454 A1 | 4/2016 | Li et al. |
| 2016/0205122 A1 | 7/2016 | Bassett |
| 2016/0277423 A1 | 9/2016 | Apostolescu et al. |
| 2016/0292599 A1 | 10/2016 | Andrews et al. |
| 2016/0301704 A1 | 10/2016 | Hassanzadeh et al. |
| 2016/0301709 A1 | 10/2016 | Hassanzadeh et al. |
| 2017/0012836 A1 | 1/2017 | Tongaonkar et al. |
| 2017/0032130 A1 | 2/2017 | Joseph et al. |
| 2017/0041334 A1 | 2/2017 | Kahn et al. |
| 2017/0078322 A1 | 3/2017 | Seiver et al. |
| 2017/0085595 A1 | 3/2017 | Ng et al. |
| 2017/0163506 A1 | 6/2017 | Keller |
| 2017/0230410 A1 | 8/2017 | Hassanzadeh et al. |
| 2017/0318050 A1 | 11/2017 | Hassanzadeh et al. |
| 2017/0324768 A1 | 11/2017 | Crabtree et al. |
| 2017/0364702 A1 | 12/2017 | Goldfarb et al. |
| 2017/0366416 A1 | 12/2017 | Beecham et al. |
| 2018/0013771 A1 | 1/2018 | Crabtree et al. |
| 2018/0103052 A1 | 4/2018 | Choudhury et al. |
| 2018/0152468 A1 | 5/2018 | Nor et al. |
| 2018/0159890 A1 | 6/2018 | Warnick et al. |
| 2018/0183827 A1 | 6/2018 | Zorlular et al. |
| 2018/0255077 A1 | 9/2018 | Paine |
| 2018/0255080 A1 | 9/2018 | Paine |
| 2018/0295154 A1 | 10/2018 | Crabtree et al. |
| 2018/0367548 A1 | 12/2018 | Stokes, III et al. |
| 2019/0052663 A1 * | 2/2019 | Lee .................... H04L 63/20 |
| 2019/0052664 A1 | 2/2019 | Kibler et al. |
| 2019/0132344 A1 | 5/2019 | Lem et al. |
| 2019/0141058 A1 | 5/2019 | Hassanzadeh et al. |
| 2019/0182119 A1 | 6/2019 | Ratkovic et al. |
| 2019/0188389 A1 | 6/2019 | Peled et al. |
| 2019/0230129 A1 * | 7/2019 | Digiambattista ... H04L 63/1441 |
| 2019/0312898 A1 | 10/2019 | Verma et al. |
| 2019/0319987 A1 | 10/2019 | Levy et al. |
| 2019/0362279 A1 | 11/2019 | Douglas |
| 2019/0370231 A1 | 12/2019 | Riggs et al. |
| 2019/0373005 A1 | 12/2019 | Bassett |
| 2020/0014718 A1 | 1/2020 | Joseph Durairaj et al. |
| 2020/0042328 A1 | 2/2020 | Gupta |
| 2020/0042712 A1 | 2/2020 | Foo et al. |
| 2020/0045069 A1 | 2/2020 | Nanda et al. |
| 2020/0099704 A1 | 3/2020 | Lee et al. |
| 2020/0112487 A1 | 4/2020 | Inamdar et al. |
| 2020/0128047 A1 | 4/2020 | Biswas et al. |
| 2020/0137074 A1 | 4/2020 | Hassanzadeh et al. |
| 2020/0175175 A1 | 6/2020 | Hadar et al. |
| 2020/0177615 A1 * | 6/2020 | Grabois ............. H04L 63/1416 |
| 2020/0177616 A1 * | 6/2020 | Hadar ................. H04L 63/1433 |
| 2020/0177617 A1 * | 6/2020 | Hadar ................. H04L 63/1433 |
| 2020/0177618 A1 | 6/2020 | Hassanzadeh et al. |
| 2020/0177619 A1 * | 6/2020 | Hadar ..................... H04L 41/14 |
| 2020/0272972 A1 * | 8/2020 | Harry .................. H04L 41/0894 |
| 2020/0296137 A1 | 9/2020 | Crabtree et al. |
| 2020/0311630 A1 | 10/2020 | Risoldi et al. |
| 2020/0351295 A1 | 11/2020 | Nhlabatsi et al. |
| 2020/0358804 A1 | 11/2020 | Crabtree et al. |
| 2021/0006582 A1 | 1/2021 | Yamada et al. |
| 2021/0099490 A1 | 4/2021 | Crabtree et al. |
| 2021/0105294 A1 | 4/2021 | Kruse et al. |
| 2021/0168175 A1 | 6/2021 | Crabtree et al. |
| 2021/0173711 A1 | 6/2021 | Crabtree et al. |
| 2021/0218770 A1 | 7/2021 | Ben-Yosef et al. |
| 2021/0248443 A1 | 8/2021 | Shu et al. |
| 2021/0273978 A1 * | 9/2021 | Hadar .................... H04L 63/20 |
| 2021/0288995 A1 | 9/2021 | Attar et al. |
| 2021/0336981 A1 | 10/2021 | Akella et al. |
| 2021/0409426 A1 | 12/2021 | Engelberg et al. |
| 2021/0409439 A1 * | 12/2021 | Engelberg ............. H04L 63/145 |
| 2022/0014445 A1 | 1/2022 | Engelberg et al. |
| 2022/0014534 A1 * | 1/2022 | Basovskiy ............ G06F 21/577 |
| 2022/0021698 A1 | 1/2022 | Hadar et al. |
| 2022/0038491 A1 | 2/2022 | Hadar et al. |
| 2022/0051111 A1 | 2/2022 | Hadar et al. |
| 2022/0070202 A1 * | 3/2022 | Busany ............... H04L 63/1433 |
| 2022/0124115 A1 | 4/2022 | Grabois et al. |
| 2022/0129590 A1 | 4/2022 | Hadar et al. |
| 2022/0131894 A1 * | 4/2022 | Hassanzadeh ......... H04L 63/18 |
| 2022/0150270 A1 | 5/2022 | Klein et al. |
| 2022/0182406 A1 | 6/2022 | Inokuchi |
| 2022/0188460 A1 | 6/2022 | Hadar et al. |
| 2022/0263855 A1 * | 8/2022 | Engelberg ................ G06N 5/04 |
| 2022/0337617 A1 | 10/2022 | Basovskiy et al. |

(56) References Cited

U.S. PATENT DOCUMENTS

| | | | |
|---|---|---|---|
| 2023/0021961 A1 | | 1/2023 | Engelberg et al. |
| 2023/0067128 A1 * | | 3/2023 | Engelberg ............ H04L 63/1433 |

FOREIGN PATENT DOCUMENTS

| | | | | |
|---|---|---|---|---|
| EP | 2385676 | | 11/2011 | |
| EP | 2816773 | | 12/2014 | |
| EP | 3644579 | | 4/2020 | |
| EP | 3664411 | | 6/2020 | |
| WO | WO-2018002484 A1 * | 1/2018 | ............ | G06F 21/577 |
| WO | WO-2020242275 A1 * | 12/2020 | ............ | G06N 20/00 |

OTHER PUBLICATIONS

Narmeen Zakaria Bawany; DDoS Attack Detection and Mitigation Using SON: Methods, Practices, and Solutions; Springer—2017; p. 425-441.

Q. Liu et al., "Latte: Large-Scale Lateral Movement Detection," MILCOM 2018—2018 IEEE Military Communications Conference (MILCOM), 2018, pp. 1-6, doi: 10.1109/MILCOM.2018.8599748. (Year: 2018).

X. Li, C. Zhang, T. Jung, J. Qian and L. Chen, "Graph-based privacy-preserving data publication," IEEE INFOCOM 2016—The 35th Annual IEEE International Conference on Computer Communications, 2016, pp. 1-9, doi: 10.1109/IN F000M.2016.7524584. (Year: 2016).

3DS.com [online], "New Customer Experience," available on or before Aug. 7, 2020 via Internet Archive: Wayback Machine URL<https://web.archive.org/web/20200807204455/https://ifwe.3ds.com/transportation-mobility/new-customer-experience>, retrieved on Jul. 9, 2021, retrieved from URL<https://ifwe.3ds.com/transportation-mobility/new-customer-experience>, 9 pages.

Amar et al., "Using finite-state models for log differencing," Proceedings of the 2018 26th ACM Joint Meeting on European Software Engineering Conference and Symposium on the Foundations of Software Engineering (ESEC/FSE 2018), Lake Buena Vista, Florida, Nov. 4-9, 2018, 49-59.

Challenge.org [online], "Incorporating digital twin into internet cyber security—creating a safer future," May 2018, retrieved on Jul. 9, 2021, retrieved from URL<https://www.challenge.org/insights/digital-twin-cyber-security/>, 10 pages.

EP Search Report in European Application. No. 21159421.3, dated Jun. 30, 2021, 11 pages.

Foundations of Databases, 1st ed., Abiteboul et al. (eds.), 1995, Chapter 12, 38 pages.

GE.com [online], "Predix Platform," available on or before Nov. 16, 2018 via Internet Archive: Wayback Machine URL<https://web.archive.org/web/20181116005032/https://www.ge.com/digital/iiot-platform>, retrieved on Jul. 9, 2021, retrieved from URL<https://www.ge.com/digital/iiot-platform>, 6 pages.

Hansen et al., "Model-in-the-Loop and Software-in-the-Loop Testing of Closed-Loop Automotive Software with Arttest," Informatik, 2017, 13 pages.

Hofner et al., "Dijkstra, Floyd and Warshall meet Kleene," Formal Aspects of Computing, Jul. 2012, 24(4-6):459-476.

Idika et al., "Extending attack graph-based security metrics and aggregating their application," IEEE Transactions on Dependable and Secure Computing, Jan./Feb. 2012, 9(1):75-85.

IEEE.org [online], "This Car Runs on Code," Feb. 1, 2009, retrieved on Jul. 9, 2021, retrieved from URL<https://spectrum.ieee.org/transportation/systems/this-car-runs-on-code>, 5 pages.

Ingols et al., "Practical Attack Graph Generation for Network Defense," 2006 22nd Annual Computer Security Applications Conference (ACSAC'06), Miami Beach, Florida, Dec. 11-15, 2006, 10 pages.

Li et al., "Cluster security research involving the modeling of network exploitations using exploitation graphs," Proceedings of the IEEE International Symposium on Cluster Computing and the Grid, Singapore, May 16-19, 2006, 11 pages.

Lippmann et al., "Validating and restoring defense in depth using attack graphs," Proceedings of the Military Communications Conference, Washington, DC, USA, Oct. 23-25, 2006, 10 pages.

Lu et al., "Ranking attack graphs with graph neural networks," Proceedings of the 5th International Conference on Information Security Practice and Experience, Xi'an, China, Apr. 13-15, 2009; Lecture Notes in Computer Science, Apr. 2009, 5451:345-359.

MaschinenMarkt.international [online], "Digital twin in the automobile industry," Aug. 1, 2019, retrieved on Jul. 9, 2021, retrieved from URL<https://www.maschinenmarkt.international/digital-twin-in-the-automobile-industry-a-851549/>, 3 pages.

Mashable.com [online], "Ford ready to innovate, but not at the expense of customer needs," May 31, 2016, retrieved on Jul. 9, 2021, retrieved from URL<https://mashable.com/article/mark-fields-ford-codecon>, 7 pages.

Mehta et al., "Ranking attack graphs," Proceedings of the International Conference on Recent Advances in Intrusion Detection, Hamburg, Germany, Sep. 20-22, 2006; Lecture Notes in Computer Science, Sep. 2006, 4219:127-144.

Noel et al., "CyGraph: Graph-Based Analytics and Visualization for Cybersecurity," Handbook of Statistics, Jan. 2016, 35:117-167.

Ortalo et al., "Experimenting with quantitative evaluation tools for monitoring operational security," IEEE Transactions on Software Engineering, Sep./Oct. 1999, 25(5):633-650.

Phillips et al., "A graph-based system for network-vulnerability analysis," Proceedings of the 1998 Workshop on New Security Paradigms, Charlottesville, Virginia, Sep. 22-26, 1998, 71-79.

Shi et al., "Normalized Cuts and Image Segmentation," IEEE Transactions on Pattern Analysis and Machine Intelligence, Aug. 2000, 22(8):888-905.

Siemens.com [online], "From vehicle design to multi-physical simulations," available on or before Jul. 26, 2019 via Internet Archive: Wayback Machine URL<https://web.archive.org/web/20190726044643/https://new.siemens.com/global/en/markets/automotive-manufacturing/digital-twin-product.html>, retrieved on Jul. 9, 2021, retrieved from URL<https://new.siemens.com/global/en/markets/automotive-manufacturing/digital-twin-product.html>, 11 pages.

SMMT.co.uk [online], "Role of Digital Twin in Automotive Industry," Dec. 17, 2018, retrieved on Jul. 9, 2021, retrieved from URL<https://www.smmt.co.uk/2018/12/role-of-digital-twin-in-automotive-industry/>, 9 pages.

Stanek et al., "Method of comparing graph differencing algorithms for software differencing," 2008 IEEE International Conference on Electro/Information Technology, Ames, Iowa, May 18-20, 2008, 482-487.

Swiler et al., "A graph-based network-vulnerability analysis system," Sandia National Laboratories, 1997, Tech. Rep. SAND97-3010/1, 25 pages.

TechCrunch.com [online], "Tesla is rolling out its Navigate on Autopilot feature," Oct. 27, 2018, retrieved on Jul. 9, 2021, retrieved from URL<https://techcrunch.com/2018/10/26/tesla-is-rolling-out-its-navigate-on-autopilot-feature/>, 17 pages.

The Fourth Industrial Revolution, 1st. ed., Schwab, Jan. 2017, 218 pages.

Vehicle Power Management, 1st ed., Zhang et al (eds.), Aug. 2011, Chapter 10, 27 pages.

Ward et al., "Threat Analysis and Risk Assessment in Automotive Cyber Security," SAE Int. J. Passeng. Cars Electron. Electr. Systems, May 2013, 6(2):507-513.

Wikipedia.org [online], "5G," last updated Jul. 9, 2021, retrieved on Jul. 9, 2021, retrieved from URL<https://en.wikipedia.org/wiki/5G>, 29 pages.

Wikipedia.org [online], "Common Vulnerabilities and Exposures," last updated Jul. 6, 2021, retrieved on Jul. 9, 2021, retrieved from URL<https://en.wikipedia.org/wiki/Common_Vulnerabilities_and_Exposures>, 5 pages.

Wikipedia.org [online], "Common Vulnerability Scoring System," last updated Jun. 21, 2021, retrieved on Jul. 9, 2021, retrieved from URL<https://en.wikipedia.org/wiki/Common_Vulnerability_Scoring_System>, 7 pages.

(56) References Cited

OTHER PUBLICATIONS

Wikipedia.org [online], "Digital twin," last updated Jul. 8, 2021, retrieved on Jul. 9, 2021, retrieved from URL<https://en.wikipedia.org/wiki/Digital_twin>, 13 pages.

Yi et al., "Overview on attack graph generation and visualization technology," 2013 International Conference on Anti-Counterfeiting, Security and Identification (ASID), Shanghai, China, Oct. 25-27, 2013, 6 pages.

Zhang et al., "Co-simulation framework for design of time-triggered cyber physical systems," 2013 ACM/IEEE International Conference on Cyber-Physical Systems (ICCPS), Philadelphia, Pennsylvania, Apr. 8-11, 2013, 119-128.

Zhao et al., "Attack graph analysis method for large scale network security hardening," J. Front. Comput. Sci. Technology, 2018, 12(2):263-273 (with English Abstract).

Alvarenga et al., "Discovering Attack Strategies Using Process Mining," Presented at Proceedings of The Eleventh Advanced International Conference on Telecommunications, Brussels, Belgium, Jun. 21-26, 2015, 119-125.

Chen et al., "Distributed Attack Modeling Approach Based on Process Mining and Graph Segmentation," Entropy, Sep. 2020, 22(9):1026, 21 pages.

Coltellese et al., "Triage of IoT Attacks Through Process Mining," Presented at Proceedings of On the Move to Meaningful Internet Systems Conference 2019, Rhodes, Greece, Oct. 21-25, 2019; Lecture Notes in Computer Science, Oct. 2019, 11877:326-344.

IEEE, "IEEE Standard for extensible Event Stream (XES) for Achieving Interoperability in Event Logs and Event Stream," IEEE Std 1849™—2016, Sep. 22, 2016, 50 pages.

Murata, "Petri Nets: Properties, Analysis and Applications," Proceedings of the IEEE, Apr. 1989, 77(4):541-580.

Neo4j.com [online], "Random Walk," available on or before Aug. 6, 2020 via Internet Archive: Wayback Machine URL<https://web.archive.org/web/20200806193136/https://neo4j.com/docs/graph-data-science/current/alpha-algorithms/random-walk/>, retrieved on Jul. 28, 2021, retrieved from URL<https://neo4j.com/docs/graph-data-science/current/alpha-algorithms/random-walk/>, 7 pages.

Neo4j.com [online], "Yen's K—Shortest Paths," available on or before Aug. 6, 2020 via Internet Archive: Wayback Machine URL<https://web.archive.org/web/20200806185626/https://neo4j.com/docs/graph-data-science/current/alpha-algorithms/yen-s-k-shortest-path/>, retrieved on Jul. 28, 2021, retrieved from URL<https://web.archive.org/web/20200806185626/https://neo4j.com/docs/graph-data-science/current/alpha-algorithms/yen-s-k-shortest-path/>, 5 pages.

PM4Py.de [online], "DEG: Process Discovery using Directly-Follows Graphs," available on or before Mar. 7, 2019 via Internet Archive: Wayback Machine URL<https://web.archive.org/web/20190307062454/http://pm4py.pads.rwth-aachen.de/documentation/process-discovery/dfg/>, retrieved on Jul. 28, 2021, retrieved from URL<https://web.archive.org/web/20190307062454/http://pm4py.pads.rwth-aachen.de/documentation/process-discovery/dfg/>, 4 pages.

PM4Py.de [online], "Process Discovery," available on or before Jun. 26, 2020 via Internet Archive: Wayback Machine URL<https://web.archive.org/web/20200626094921/https://pm4py.fit.fraunhofer.de/documentation#discovery>, retrieved on Jul. 28, 2021, retrieved from URL<https://pm4py.fit.fraunhofer.de/documentation#discovery>, 5 pages.

Van Der Aalst et al., "Causal Nets: A Modeling Language Tailored towards Process Discovery," Presented at Proceedings of CONCUR 2011—Concurrency Theory, Aachen, Germany, Sep. 6-9, 2011; Lecture Notes in Computer Science, Sep. 2011, 6901:28-42.

Wikipedia.org [online], "Breadth-first search," last updated Jul. 21, 2021, retrieved on Jul. 28, 2021, retrieved from URL<https://en.wikipedia.org/wiki/Breadth-first_search, 6 pages.

Wikipedia.org [online], "Depth-first search," last updated Jun. 16, 2021, retrieved on Jul. 28, 2021, retrieved from URL<https://en.wikipedia.org/wiki/Depth-first_search, 8 pages.

Borgatti et al., "A Graph-theoretic perspective on centrality," Social Networks, Oct. 2006, 28(4):466-484.

EP Search Report in European Application. No. EP20185251, dated Oct. 21, 2020, 7 pages.

Wang et al., "A Network Vulnerability Assessment Method Based on Attack Graph," 2018 IEEE 4th International Conference on Computer and Communications, Dec. 7-10, 2018, Chengdu, China, 1149-1154.

EP Extended Search Report in European Appln. No. 21191752.1, dated Jan. 4, 2022, 8 pages.

Wikipedia.org [online], "Eigenvector centrality," last updated Dec. 1, 2020 retrieved on Jan. 11, 2021, retrieved from URL<https://en.wikipedia.org/wiki/Eigenvector_centrality, 4 pages.

Wikipedia.org [online], "Floyd-Warshall algorithm," last updated Jan. 5, 2021, retrieved on Jan. 11, 2021, retrieved from URL<https://en.wikipedia.org/wiki/Floyd%E2%80%93Warshall_algorithm, 7 pages.

Wikipedia.org [online], "Sigmoid function," last updated Dec. 25, 2020, retrieved on Jan. 11, 2021, retrieved from URL<https://en.wikipedia.org/wiki/Sigmoid_function, 4 pages.

Abraham et al., "Cyber Security Analytics: A Stochastic Model for Security Quantification Using Absorbing Markov Chains," Journal of Communications, Dec. 2014, 9(12):899-907.

Atoum et al., "A holistic cyber security implementation framework," Information Management & Computer Security, Jul. 2014, 22(3):251-264.

Fielder et al., "Decision support approaches for cyber security investment," Decision Support Systems, Jun. 2016, 86:13-23.

Gergeleit et al., "Modeling Security Requirements and Controls for an Automated Deployment of Industrial IT Systems," Kommunikation und Bildverarbeitung in der Automation. Technologien für die intelligente Automation (Technologies for Intelligent Automation), Jan. 14, 2020, 12:217-231.

Grieves, "Virtually Intelligent Product Systems: Digital and Physical Twins", Complex Systems Engineering: Theory and Practice, Jul. 2019, 256:175-200.

Hadar et al., "Cyber Digital Twin Simulator for Automatic Gathering and Prioritization of Security Controls Requirements," Proceedings of the 2020 IEEE 28th International Requirements Engineering Conference, Aug. 31-Sep. 4, 2020, Zurich, Switzerland, 250-259.

Hasan et al., "Towards Optimal Cyber Defense Remediation in Energy Delivery Systems", Proceedings of 2019 IEEE Global Communications Conference, Dec. 9-13, 2019, Waikoloa, Hawaii, 7 pages.

Husák et al., "Survey of Attack Projection, Prediction, and Forecasting in Cyber Security," IEEE Communications Surveys & Tutorials, Sep. 24, 2018, 21(1):640-660.

International Organization for Standardization, "International Standard: ISO/IEC 27001," ISO/IEC 27001:2013(E), Oct. 1, 2013, 29 pages.

Joint Task Force Transformation Initiative, "Security and Privacy Controls for Federal Information Systems and Organizations," National Institute of Standards and Technology Special Publication 800-53, Revision 4, Jan. 22, 2015, 462 pages.

Khouzani et al., "Scalable min-max multi-objective cyber-security optimization over probabilistic attack graphs", European Journal of Operational Research, Nov. 1, 2019, 278(3):894-903.

Schatz et al., "Economic valuation for information security investment: a systematic literature review," Information Systems Frontiers, Apr. 18, 2016, 19:1205-1228.

Shandilya et al., "Use of Attack Graphs in Security Systems", Hindawi Journal of Computer Networks and Communications, Oct. 20, 2014, 2014:818957, 14 pages.

Strom et al., "MITRE ATT&CK™: Design and Philosophy", The MITRE Corporation, Jul. 2018, 37 pages.

Wikipedia.org [online], "Centrality," last updated Oct. 18, 2020, retrieved on Oct. 26, 2020, retrieved from URL<https://en.wikipedia.org/wiki/Centrality>, 15 pages.

Wikipedia.org [online], "SWOT analysis," last updated Oct. 20, 2020, retrieved on Oct. 26, 2020, retrieved from URL<https://en.wikipedia.org/wiki/SWOT_analysis>, 8 pages.

Wikipedia.org [online], "Traffic congestion," last updated Oct. 5, 2020, retrieved on Oct. 26, 2020, retrieved from URL<https://en.wikipedia.org/wiki/Traffic_congestion, 24 pages.

(56) References Cited

OTHER PUBLICATIONS

Wikipedia.org [online], "Traffic flow," last updated Oct. 19, 2020, retrieved on Oct. 26, 2020, retrieved from URL<https://en.wikipedia.org/wiki/Traffic_flow>, 41 pages.

Wildpedia.org [online], "Zero-day (computing)," last updated Oct. 16, 2020, retrieved on Oct. 26, 2020, retrieved from URL<https://en.wikipedia.org/wiki/Zero-day_(computing)>, 8 pages.

Xie et al., "Using Bayesian Networks for Cyber Security Analysis," Proceedings of the 2010 IEEE/IFIP International Conference on Dependable Systems & Networks, Jun. 28-Jul. 1, 2010, Chicago, Illinois, 211-220.

You et al., "A Review of Cyber Security Controls from An ICS Perspective," Proceedings of 2018 International Conference on Platform Technology and Service (PlatCon), Jan. 29-31, 2018, Jeju, South Korea, 5 pages.

Zeng et al., "Survey of Attack Graph Analysis Methods from the Perspective of Data and Knowledge Processing," Hindawi Security and Communication Networks, Dec. 26, 2019, 2019:2031063, 17 pages.

Zhang et al., "Optimal Decision-Making Approach for Cyber Security Defense Using Game Theory and Intelligent Learning," Security and Communication Networks, Dec. 23, 2019, 2019:3038586, 17 pages.

Brazhuk, "Towards automation of threat modeling based on a semantic model of attack patterns and weaknesses," arXiv, Dec. 8, 2021, arXiv:2112.04231v1, 14 pages.

EP Extended Search Report in European Appln. No. 22157487.4, dated Jun. 9, 2022, 10 pages.

Hemberg et al., "BRON—Linking Attack Tactics, Techniques, and Patterns with Defensive Weaknesses, Vulnerabilities and Affected Platform Configurations," arXiv, Oct. 1, 2020, arXiv:2010.00533v1, 14 pages.

Hemberg et al., "Using a Collated Cybersecurity Dataset for Machine Learning and Artificial Intelligence," arXiv, Aug. 5, 2021, arXiv:2108.02618v1, 5 pages.

Horrocks et al., "SWRL: A Semantic Web Rule Language Combining OWL and RuleML," W3C Member Submission, May 21, 2004, 24 pages.

Neo4j.com [online], "Topological link prediction," available on or before May 17, 2020, via Internet Archive: Wayback Machine URL<https://web.archive.org/web/20200517111258/https://neo4j.com/docs/graph-data-science/current/algorithms/linkprediction/>, retrieved on Jun. 14, 2022, retrieved from URL<https://neo4j.com/docs/graph-data-science/current/algorithms/linkprediction/>, 2 pages.

Rossi et al., "Knowledge Graph Embedding for Link Prediction: A Comparative Analysis," arXiv, Feb. 3, 2020, arXiv:2002.00819v1, 42 pages.

Wikipedia.org [online], "Natural language processing," last updated Jun. 10, 2022, retrieved on Jun. 14, 2022, retrieved from URL<https://en.wikipedia.org/wiki/Natural_language_processing>, 13 pages.

Kaloroumakis et al., "Toward a Knowledge Graph of Cybersecurity Countermeasures," Technical Report, The MITRE Corporation, 2021, 11 pages.

MITRE.org [online], "D3FEND," available on or before Jun. 22, 2021 via Internet Archive: Wayback Machine URL<https://web.archive.org/web/20210622142005/https://d3fend.mitre.org/>, retrieved on Jul. 13, 2022, retrieved from URL<https://d3fend.mitre.org/>, 3 pages.

MITRE.org [online], "Digital Artifact Ontology," available on or before Jun. 25, 2021 via Internet Archive: Wayback Machine URL<https://web.archive.org/web/20210625024718/https://d3fend.mitre.org/dao>, retrieved on Jul. 13, 2022, retrieved from URL<https://d3fend.mitre.org/dao/>, 3 pages.

MITRE.org [online], "Service Application," available on or before Jun. 25, 2021 via Internet Archive: Wayback Machine URL<https://web.archive.org/web/20210625024952/https://d3fend.mitre.org/dao/artifact/d3f:ServiceApplication/>, retrieved on Jul. 13, 2022, retrieved from URL<https://d3fend.mitre.org/dao/artifact/d3f:ServiceApplication/>, 1 page.

Wikipedia.org [online], "Reachability," last updated Oct. 22, 2021, retrieved on Jul. 13, 2022, retrieved from URL<https://en.wikipedia.org/wiki/Reachability>, 5 pages.

Barik et al., "Attack Graph Generation and Analysis Techniques," Defence Science Journal, Nov. 2016, 66(6):559-567.

Barrère et al., "Naggen: a Network. Attack Graph GENeration Tool—IEE CNS 17 Poster," 2017 IEEE Conference on Communications and Network Security, Oct. 2017, Las Vegas, NV, USA, 378-379.

Bonacich, "Power and Centrality: A Family of Measures," American Journal of Sociology, Mar. 1987, 92(5):1170-1182.

Cohen-Addad et al., "Hierarchical Clustering: Objective Functions and Algorithms," Journal of the ACM, Jun. 2019, 66(4):26, 42 pages.

EP Search Report in European Application No. EP 19212981, dated Mar. 4, 2020, 6 pages.

EP Search Report in European Application No. EP13290145, dated Nov. 12, 2013, 2 pages.

EP Search Report in European Application No. EP19212974, dated Feb. 14, 2020, 8 pages.

EP Search Report in European Application No. EP19212976, dated Feb. 14, 2020, 8 pages.

Fundamentals of Business Process Management, 2nd ed., Dumas et al. (eds.), 1998, 546 pages.

Hadar et al., "Big Data Analytics on Cyber Attack Graphs for Prioritizing Agile Security Requirements", Proceedings of the 2019 IEEE 27th International Requirements Engineering Conference, Sep. 23-27, 2019, Jeju Island, Kora, 330-339.

Manning Free Content Center [online], "Building Your Vocabulary," dated May 19, 2017, retrieved on Jun. 3, 2020, retrieved from URL <https://freecontent.manning.com/building-your-vocabulary/>, 10 pages.

National Institute of Standards and Technology [online], "National Vulnerability Database," last updated Jun. 2, 2020, retrieved on Jun. 3, 2020, retrieved from URL<https://nvd.nist.gov/>, 4 pages.

Networks: An Introduction, Newman (ed.), May 2010, 789 pages.

Ou et al., "A Scalable Approach to Attack Graph Generation," Proceedings of the 13th ACM Conference on Computer and Communication Security, Oct. 2006, 336-345.

Ou et al., "MulVAL: A Logic-based Network Security Analyzer," 14th USENIX Security Symposium, Aug. 2005, Baltimore, MD, USA, 16 pages.

Process Mining, 1st ed., van der Aalst, 2011, Chapters 5-6, 63 pages.

Purvine et al., "A Graph-Based Impact Metric for Mitigating Lateral Movement Cyber Attacks", Automated Descision Making for Active Cyber Defence, Oct. 2016, pp. 45-52.

Sourceforge.net [online], "XSB," last updated Oct. 29, 2017, retrieved on Jun. 3, 2020, retrieved from URL <http://xsb.sourceforge.net/>, 2 pages.

The MITRE Corporation [online], "MITRE ATT&CK," last updated May 27, 2020, retrieved on Jun. 3, 2020, retrieved from URL <https://attack.mitre.org/>, 3 pages.

Ullah et al., "Towards Modeling Attacker's Opportunity for Improving Cyber Resilience in Energy Delivery Systems", Resilience Week, Aug. 2018, pp. 100-107.

Wang et al., "Exploring Attack Graph for Cost-benefit Security Hardening: A Probabilistic Approach," Computers & Security, Feb. 2013, 32:158-169.

Wikipedia.org [online], "Active Directory," last updated Jun. 1, 2020, retrieved on Jun. 3, 2020, retrieved from URL <https://en.wikipedia.org/wiki/Active_Directory, 14 pages.

Wikipedia.org [online], "Backward Chaining," last updated Nov. 16, 2019, retrieved on Jun. 3, 2020, retrieved from URL <https://en.wikipedia.org/wiki/Backward_chaining, 3 pages.

Wikipedia.org [online], "Cartesian Product," last updated Feb. 28, 2020, retrieved on Jun. 3, 2020, retrieved from URL <https://en.wikipedia.org/wiki/Cartesian_product, 9 pages.

Wikipedia.org [online], "Centrality," last updated May 29, 2020, retrieved on Jun. 3, 2020, retrieved from URL <https://en.wikipedia.org/wiki/Centrality>, 15 pages.

Wikipedia.org [online], "Flood Fill," last updated Dec. 24, 2019, retrieved on Jun. 3, 2020, retrieved from URL <https://en.wikipedia.org/wiki/Flood_fill>, 7 pages.

(56) References Cited

OTHER PUBLICATIONS

Wikipedia.org [online], "Forward Chaining," last updated Nov. 18, 2019, retrieved on Jun. 3, 2020, retrieved from URL <https://en.wikipedia.org/wiki/Forward_chaining, 3 pages.

Wikipedia.org [online], "Look-ahead (backtracking)," last updated May 23, 3030, retrieved on Jun. 3, 2020, retrieved from URL <https://en.wikipedia.org/wiki/Look-ahead_(backtracking), 3 pages.

Wikipedia.org [online], "SCADA" last updated Jun. 2, 2020, retrieved on Jun. 3, 2020, retrieved from URL <https://en.wikipedia.org/wiki/SCADA>, 12 pages.

Almeida et al., "An ontological analysis of the notion of community in the RM-ODP enterprise language," Computer Standards & Interfaces, Mar. 2013, 35(3):257-268.

Annane et al., "BBO: BPMN 2.0 based ontology for business process representation," Presented at Proceedings of the 20th European Conference on Knowledge Management (ECKM 2019), Lisbonne, Portugal, Sep. 5-6, 2019, 49-59.

Ashton et al., "That 'internet of things' thing," RFID Journal, Jun. 22, 2009, 1 page.

Borgo et al., "Ontological Foundations of DOLCE," Theory and Applications of Ontology: Computer Applications, Aug. 5, 2010, 279-295.

Burger et al., "Scaling to the end of silicon with edge architectures," Computer, Jul. 2004, 37(7):44-55.

Cravero, "Big data architectures and the internet of things: A systematic mapping study," IEEE Latin America Transactions, Apr. 2018, 16(4):1219-1226.

Daniele et al., "An ontological approach to logistics," Enterprise Interoperability: Research and Applications in the Service-oriented Ecosystem, Oct. 11, 2013, 199-213.

Degen et al., "Gol: toward an axiomatized upper-level ontology," Presented at Proceedings of the International Conference on Formal Ontology in Information Systems, Ogunquit, Maine, USA, Oct. 17-19, 2001, 34-46.

Duarte et al., "Towards an Ontology of Requirements at Runtime," Formal Ontology in Information Systems, Jan. 2016, 283:255-268.

El Saddik, "Digital Twins: The Convergence of Multimedia Technologies," IEEE MultiMedia, Apr.-Jun. 2018, 25(2):87-92.

Gailly et al., "Ontological Reengineering of the REA-EO using UFO," Presented at Proceedings of the International Workshop on Ontology-Driven Software Engineering, Orlando, FL, USA, Oct. 2009, 15 pages.

Gandomi et al., "Beyond the hype: Big data concepts, methods, and analytics," International Journal of Information Management, Apr. 2015, 35(2):137-144.

Genovese, "Data mesh: the newest paradigm shift for a distributed architecture in the data world and its application," Thesis for the degree of Computer Engineering, Politecnico di Torino, 2021, 76 pages.

Giunchiglia et al., "Lightweight Ontologies," Technical Report DIT-07-071, University of Trento, Oct. 2007, 10 pages.

Gomez-Perez et al., "Ontology languages for the Semantic Web," IEEE Intelligent Systems, Feb. 2002, 17(1):54-60.

Guarino, "Formal Ontology in Information Systems," Presented at Proceedings of the 1st International Conference, Trento, Italy, Jun. 6-8, 1998, 3-15.

Guizzardi et al., "An Ontology-Based Approach for Evaluating the Domain Appropriateness and Comprehensibility Appropriateness of Modeling Languages," MoDELS, 2005, 691-705.

Guizzardi, "On Ontology, ontologies, Conceptualizations, Modeling Languages, and (Meta)Models," Presented at Proceedings of the 2007 conference on Databases and Information Systems IV: Selected Papers from the Seventh International Baltic Conference, Amsterdam, Netherlands, Jun. 5, 2007, 18 pages.

Guizzardi, "Ontological Foundations for Structural Conceptual Models," Thesis for the degree of Doctor, University of Twente, 2005, 441 pages.

Guizzardi, "Ontology, Ontologies and the "I" of FAIR," Data Intelligence, Jan. 1, 2020, 2(1-2):181-191.

Guizzardi, "The role of foundational ontology for conceptual modeling and domain ontology representation," Presented at Proceedings of the 7th International Baltic Conference on Databases and Information Systems, Vilnius, Lithuania, Jul. 3-6, 2006, 9 pages.

Hassani et al., "Artificial Intelligence (AI) or Intelligence Augmentation (IA): What Is the Future?," AI, Apr. 12, 2020, 1(2):143-155.

Herre, "General Formal Ontology (GFO): A Foundational Ontology for Conceptual Modelling," Theory and Applications of Ontology: Computer Applications, Aug. 12, 2010, 297-345.

Jacobsen et al., "FAIR Principles: Interpretations and Implementation Considerations," Data Intelligence, Jan. 1, 2020, 2(1-2):10-29.

Machado et al., "Data Mesh: Concepts and Principles of a Paradigm Shift in Data Architectures," Procedia Computer Science, 2022, 196:263-271.

Machado et al., "Data-Driven Information Systems: The Data Mesh Paradigm Shift," Presented at Proceedings of the 29th International Conference on Information Systems Development, Valencia, Spain, Sep. 8-10, 2021, 6 pages.

Makridakis, "The forthcoming artificial intelligence (ai) revolution: Its impact on society and firms," Futures, Jun. 2017, 90:46-60.

Martins et al., "A framework for conceptual characterization of ontologies and its application in the cybersecurity domain," Software and Systems Modeling, Jul. 2, 2022, 21:1437-1464.

Martins et al., "Conceptual Characterization of Cybersecurity Ontologies," The Practice of Enterprise Modelling, Nov. 18, 2020, 323-338.

Mathis, "Data lakes," Datenbank-Spektrum, Oct. 6, 2017, 17(3):289-293.

Monino, "Data Value, Big Data Analytics, and Decision-Making," Journal of the Knowledge Economy, Aug. 20, 2016, 256-267.

Sales et al., "Ontological anti-patterns in taxonomic structures," Presented at Proceedings of ONTOBRAS 2019: XII Seminar on Ontology Research in Brazil, Porto Alegre, Brazil, Sep. 2-5, 2019, 13 pages.

Sitton-Candanedo et al., "A review of edge computing reference architectures and a new global edge proposal," Future Generation Computer Systems, Oct. 2019, 99:278-294.

Tan et al., "Future internet: The Internet of Things," Presented at Proceedings of the 2010 3rd International Conference on Advanced Computer Theory and Engineering (ICACTE), Chengdu, China, Aug. 20-22, 2010.

Uschold et al., "Ontologies: Principles, methods and applications," The Knowledge Engineering Review, Jan. 1996, 11(2):93-136.

Van Heijst et al., "Using explicit ontologies in KBS development," International Journal of Human-Computer Studies, Feb. 1997, 46(2-3):183-292.

Wand et al., "On the deep structure of information systems," Information Systems Journal, Jul. 1995, 5(3):203-223.

Wang et al., "Big data analytics in cyber security: network traffic and attacks," Journal of Computer Information Systems, Jan. 2020, 61(3):1-8.

Wu et al., "A service-oriented architecture for business intelligence," Presented at Proceedings of the IEEE International Conference on Service-Oriented Computing and Applications (SOCA '07), Newport Beach, CA, USA, Jun. 19-20, 2007, 279-285.

CyberSecurityWorks.com [online], "MITRE Mapping of CISA KEVs and its Challenges," Jun. 29, 2022, retrieved on Oct. 4, 2022, retrieved from URL<https://cybersecurityworks.com/blog/cisa/mitre-mapping-of-cisa-kevs-and-its-challenges.html>, 6 pages.

Cycognito.com [online], "Identifying and Managing Vulnerabilities on All Your Attacker-Exposed Assets, All the Time: Benefits of the CyCognito Platform for Vulnerability Management," available on or before Oct. 22, 2020 via Internet Archive: Wayback Machine URL<https://web.archive.org/web/20201022120625/https://www.cycognito.com/vulnerability-management>, retrieved on Oct. 4, 2022, retrieved from URL<https://www.cycognito.com/vulnerability-management>, 15 pages.

Das et al., "V2W-BERT: A Framework for Effective Hierarchical Multiclass Classification of Software Vulnerabilities," CoRR, submitted on Feb. 23, 2021, arXiv:2102.11498v1, 11 pages.

GitHub.com [online], "ALFA-group/BRON," available on or before Nov. 23, 2021 via Internet Archive: Wayback Machine URL<https://web.archive.org/web/20211123023700/https://github.com/ALFA-

(56) References Cited

OTHER PUBLICATIONS group/BRON>, retrieved on Oct. 4, 2022, retrieved from URL<https://github.com/ALFA-group/BRON>, 5 pages.

Grigorescu et al., "CVE2ATT&CK: BERT-Based Mapping of CVEs to MITRE ATT&CK Techniques," Algorithms, Aug. 31, 2022, 15(9):314, 22 pages.

Mitre.org [online], "CAPEC: Common Attack Pattern Enumerations and Classifications," available on or before Jul. 21, 2007 via Internet Archive: Wayback Machine URL<https://web.archive.org/web/20070721234158/https://capec.mitre.org/>, retrieved on Oct. 4, 2022, retrieved from URL<https://capec.mitre.org/>, 2 pages.

Mitre.org [online], "CWE: Common Weakness Enumeration," available on or before Oct. 9, 2006 via Internet Archive: Wayback Machine URL<https://web.archive.org/web/20061009060144/https://cwe.mitre.org/>, retrieved on Oct. 4, 2022, retrieved from URL<https://cwe.mitre.org/>, 1 page.

W3.org [online], "SWRL: A Semantic Web Rule Language Combining OWL and RuleML," May 21, 2004, retrieved on Oct. 4, 2022, retrieved from URL<https://www.w3.org/Submission/SWRL/>, 24 pages.

Chen Zhong, Towards Agile Cyber Analysis: Leveraging Visualization as Functions in Collaborative Visual Analytics, IEEE:2017, pp. 1-2.

EP Extended Search Report in European Appln. No. 22187514.9, dated Nov. 29, 2022, 7 pages.

EP Extended Search Report in European Appln. No. 22193272.6, dated Jan. 25, 2023, 8 pages.

\* cited by examiner

EVALUATING EFFECTIVENESS OF SECURITY CONTROLS IN ENTERPRISE NETWORKS USING GRAPH VALUES

CROSS-REFERENCE TO RELATED APPLICATION

This application claims the benefit of U.S. App. No. 62/873,530, filed Jul. 12, 2019, the disclosure of which is expressly incorporated herein by reference in the entirety.

BACKGROUND

Computer networks are susceptible to attack by malicious users (e.g., hackers). For example, hackers can infiltrate computer networks of enterprises (enterprise networks) in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, and alert security personnel to such occurrences. In response to vulnerabilities detected within an enterprise network, one or more security controls can be implemented to mitigate risk presented by a vulnerability. However, implementing security controls requires expenditure of time and technical resources (e.g., processors, memory, bandwidth). Implementing ineffective security controls not only results in failing to mitigate the vulnerability, leaving the enterprise network susceptible to risk, it also results in wasted and/or inefficient use of technical resources.

SUMMARY

Implementations of the present disclosure are directed to security controls for enterprise-wide cyber-security. More particularly, implementations of the present disclosure are directed to executing one or more security controls and evaluating effectiveness of the one or more security controls in mitigating vulnerabilities within an enterprise network. In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving, from an agile security platform, analytical attack graph (AAG) data representative of one or more AAGs, each AAG representing one or more lateral paths within an enterprise network for reaching a target asset from one or more assets within the enterprise network, determining, for each instance of a plurality of instances of the AAG, a graph value representing a measure of hackability of the enterprise network at respective times, providing a profile of the enterprise network based on a set of graph values determined for instances of the AAG, the profile representing changes in graph values over time, determining an effectiveness of one or more security controls based on the profile, and selectively executing one or more remedial actions in response to the effectiveness. Other implementations of this aspect include corresponding systems, apparatus, and computer programs, configured to perform the actions of the methods, encoded on computer storage devices.

These and other implementations can each optionally include one or more of the following features: each graph value in the set of graph values is calculated as:

$$GV = \sum_{i=1}^{N} EV_i * e^{-\frac{H_i}{\alpha}}$$

where N is a number of impacts in a respective AAG, $i \in [1 \ldots N]$, $EV_i$ is an Eigenvector centrality for an impact with index i, $H_i$ is a hardness value representing a difficulty of arriving to impact i, and $\alpha$ is an empirical value; $H_i$ is calculated as:

$$H_i = H_{R_i} + H_{i-1}$$

where $H_{R_i}$ is a hardness value representing a difficult in meeting a rule (R) to arrive at impact i from impact i−1; $H_i$ is calculated as:

$$H_i = \frac{1}{\frac{1}{H_{P_1} + H_{R_{1-i}}} + \frac{1}{H_{P_2} + H_{R_{2-i}}} + \ldots}$$

where $H_{P_1}$ and $H_{P_2}$ are hardness values of respective paths to impact i within the respective AAG indicating difficulty in moving along the respective paths, and $H_{R_{1-i}}$ and $H_{R_{2-i}}$ are hardness values of respective rules (R) to arrive at impact i within the respective AAG indicating difficulty in meeting the respective rules to move along the respective paths; the one or more remedial actions comprise one or more of rolling back at least one security control of the one or more security controls, and implementing at least one additional security control; the one or more security controls are determined to be ineffective in response to graph values in the set of graph values increasing over time after implementation of the one or more security controls; and the one or more security controls include one or more security controls provided in ISO/IEC 27001.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and

DESCRIPTION OF DRAWINGS

Like reference symbols in the various drawings indicate like elements.

DETAILED DESCRIPTION

Figure 1:
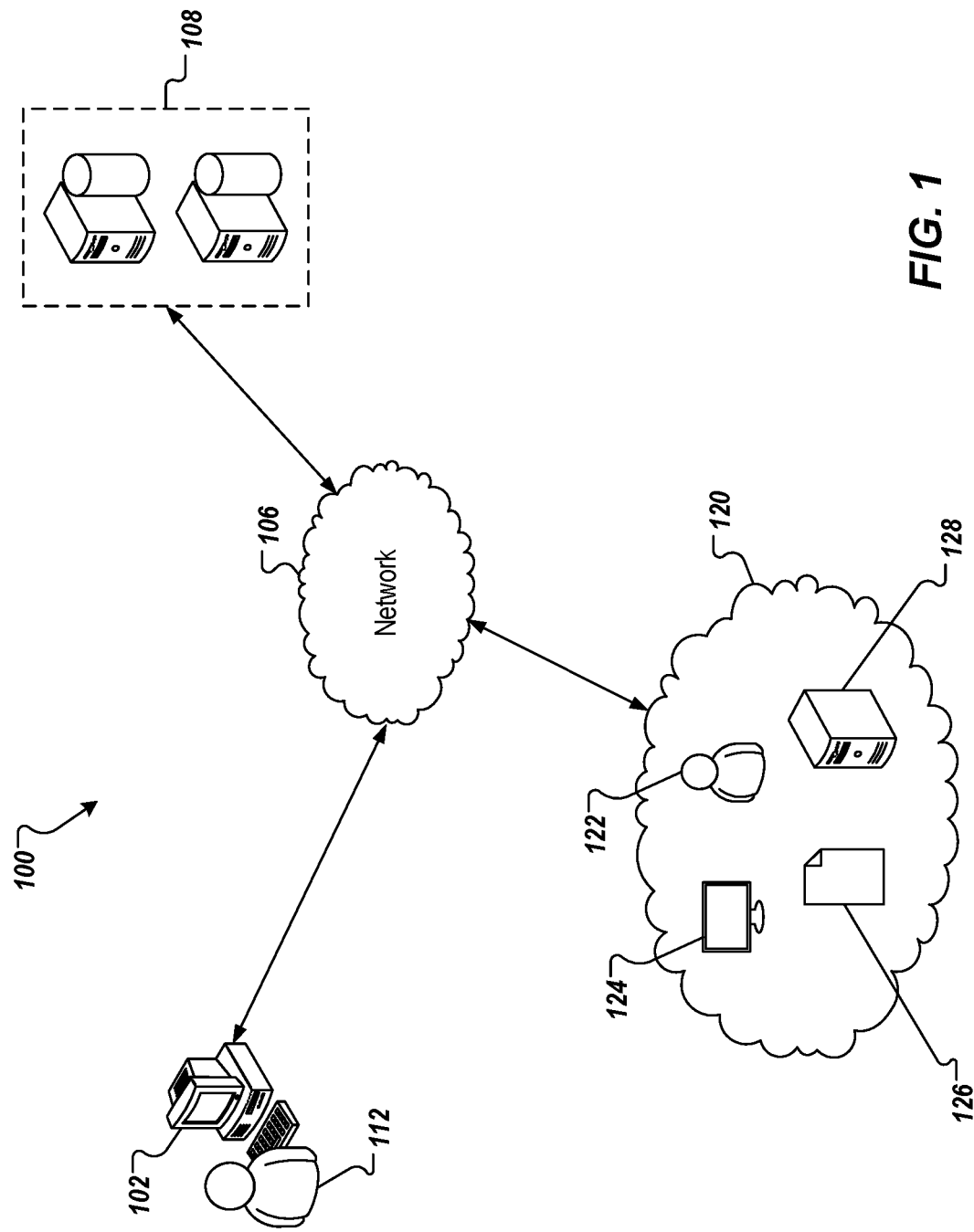
FIG. 1 depicts an example architecture that can be used to execute implementations of the present disclosure.

Implementations of the present disclosure are directed to security controls for enterprise-wide cyber-security. More particularly, implementations of the present disclosure are directed to executing one or more security controls and evaluating effectiveness of the one or more security controls in mitigating vulnerabilities within an enterprise network. In some examples, implementations of the present disclosure are provided within an agile security platform that determines asset vulnerability of enterprise-wide assets including cyber-intelligence and discovery aspects of enterprise information technology (IT) systems and operational technology (OT) systems, asset value, potential for asset breach and criticality of attack paths towards target(s) including hacking analytics of enterprise IT/OT systems.

In some implementations, actions include receiving, from an agile security platform, analytical attack graph (AAG) data representative of one or more AAGs, each AAG representing one or more lateral paths within an enterprise network for reaching a target asset from one or more assets within the enterprise network, determining, for each instance of a plurality of instances of the AAG, a graph value representing a measure of hackability of the enterprise network at respective times, providing a profile of the enterprise network based on a set of graph values determined for instances of the AAG, the profile representing changes in graph values over time, determining an effectiveness of one or more security controls based on the profile, and selectively executing one or more remedial actions in response to the effectiveness.

To provide context for implementations of the present disclosure, and as introduced above, Computer networks are susceptible to attack by malicious users (e.g., hackers). For example, hackers can infiltrate computer networks of enterprises (enterprise networks) in an effort to obtain sensitive information (e.g., user credentials, payment information, address information, social security numbers) and/or to take over control of one or more systems. To defend against such attacks, enterprises use security systems to monitor occurrences of potentially adverse events occurring within a network, or existing malicious software, and alert security personnel to such occurrences. In response to vulnerabilities detected within an enterprise network, one or more security controls can be implemented to mitigate risk presented by a vulnerability. However, implementing security controls requires expenditure of time and technical resources (e.g., processors, memory, bandwidth). Implementing ineffective security controls not only results in failing to mitigate the vulnerability, leaving the enterprise network susceptible to risk, it also results in wasted and/or inefficient use of technical resources.

In view of the above context, implementations of the present disclosure are directed to executing one or more security controls within an enterprise network and generating graph values to determine asset vulnerability of enterprise-wide assets. In some examples, the graph values are determined based on analytical attack graphs (AAGs). Implementations of the present disclosure also provide time-based graphs to monitor effectiveness of security control. As described in further detail herein, implementations of the present disclosure achieve multiple technical improvements. Example improvement includes, without limitation, more efficient use of technical resources and reducing risk to enterprise networks. For example, by determining effectiveness of security controls in accordance with implementations of the present disclosure, more efficient use of technical resources within the enterprise network can be achieved by avoiding or removing ineffective security controls and/or implementing security controls that are effective in addressing vulnerabilities. As another example, the graph value approach of the present disclosure, based on AAGs, enables operators to accurately quantify risk within enterprise networks at varying levels of granularity (e.g., down to individual security controls), enabling efficient use of technical resources in mitigating vulnerabilities in enterprise networks. In short, implementations of the present disclosure are rooted in computer technology in order to overcome problems specifically arising in the realm of computer networks.

In some implementations, an agile security platform executes implementations of the present disclosure as described herein. It is appreciated, however, that implementations of the present disclosure can be realized using any appropriate security platform. The agile security platform enables continuous cyber and enterprise-operations alignment controlled by risk management. The agile security platform improves decision-making by helping enterprises to prioritize security actions that are most critical to their operations. In some examples, the agile security platform combines methodologies from agile software development lifecycle, IT management, development operations (DevOps), and analytics that use artificial intelligence (AI). In some examples, agile security automation bots continuously analyze attack probability, predict impact, and recommend prioritized actions for cyber risk reduction. In this manner, the agile security platform enables enterprises to increase operational effectiveness and availability, maximize existing cyber-security resources, reduce additional cyber-security costs, and grow organizational cyber resilience.

As described in further detail herein, the agile security platform provides for discovery of IT/OT supporting elements within an enterprise, which elements can be referred to as configuration items (CI). Further, the agile security platform can determine how these CIs are connected to provide a CI network topology. In some examples, the CIs are mapped to processes and services of the enterprise, to determine which CIs support which services, and at what stage of an operations process. In this manner, a services CI topology is provided.

In some implementations, the specific vulnerabilities and improper configurations of each CI are determined and enable a list of risks to be mapped to the specific IT/OT network of the enterprise. Further, the agile security platform of the present disclosure can determine what a malicious user (hacker) could do within the enterprise network, and whether the malicious user can leverage additional elements in the network such as scripts, CI configurations, and the like. Accordingly, the agile security platform enables analysis of the ability of a malicious user to move inside the network, namely, lateral movement within the network. This includes, for example, how a malicious user could move from one CI to another CI, what CI (logical or physical) can be damaged, and, consequently, damage to a respective service provided by the enterprise.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

In some implementations, the agile security platform is hosted within the server system 108, and monitors and acts on the enterprise network 120, as described herein. More particularly, and as described in further detail herein, one or more AAGs representative of the enterprise network are generated in accordance with implementations of the present disclosure. For example, the agile security platform detects IT/OT assets and generates an asset inventory and network maps, as well as processing network information to discover vulnerabilities in the enterprise network 120. The agile security platform executes the resource-efficient AAG generation of the present disclosure based on the network information.

In some examples, the agile security platform provides one or more dashboards, alerts, notifications and the like to cyber-security personnel that enable the cyber-security personnel to react to and remediate security relevant events. For example, the user 112 can include a cyber-security expert that views and responds to dashboards, alerts, and/or notifications of the agile security platform using the client device 102.

In accordance with implementations of the present disclosure, the agile security platform operates over multiple phases. Example phases include an asset discovery, anomaly detection, and vulnerability analysis phase, a cyber resilience risk analysis phase, and a cyber resilience risk recommendation phase.

With regard to the asset discovery, anomaly detection, and vulnerability analysis phase, discovering what vulnerabilities exit across the vertical stack and the relevant use cases is imperative to be conducted from the enterprise IT to the control systems. A focus of this phase is to generate the security backlog of issues, and potential remediations.

Rather than managing each technology layer separately, the agile security platform addresses lateral movements across the stack. Through devices, communication channels (e.g., email, TCP/IP), and/or operation systems, vulnerabilities are addressed within the context of a service (e.g., a service that the enterprise offers to customers), and a cyber kill chain to a target in the operation vertical, generating operation disturbance by manipulation of data. The notion of a CI assists in mapping dependencies between IT/OT elements within a configuration management DB (CMDB). A so-called security CI (SCI) maps historical security issues of a certain managed security element and is mapped into a security aspect of a digital twin.

As a result, a stack of technologies is defined, and is configured in a plug-in reference architecture (replaceable and extensible) manner. The stack addresses different aspects of monitoring, harvesting, and alerting of information within different aggregations views (dashboards) segmented according to owners and relevant IT and security users. An example view includes a health metric inserted within the dashboard of an enterprise application. In some examples, the health metric indicates the security condition of the underlying service and hence, the reliability of the provided data and information. Similar to risks that can be driven by labor, inventory, or energy, security risk concern can be presented and evaluated in the operations-level, drilled-through for additional transparency of the issue, and can be optimally remediated by allocating investments to automation or to security and IT personal with adequate operations awareness.

With regard to the cyber resilience risk analysis phase, each vulnerability may have several remediations, and each has a cost associated with it, either per internal personnel time, transaction, service, or retainer, as well as the deferred cost of not acting on the issue. A focus of this phase is to enable economical decision-making of security investments, either to be conducted by the IT and security team or directly by automation, and according to risk mitigation budget.

In further detail, observing a single-issue type and its remediations does not reflect the prioritization between multiple vulnerabilities. Traditional systems are based on global risk assessment, yet the context in which the SCI is part of is missing. The overall risk of a process matters differently for each enterprise. As such, remediation would occur according to gradual hardening of a process according to prioritization, driven in importance and responsibility by the enterprise, not by gradual hardening of all devices, for example, in the organization according to policy, without understanding of the impact on separated operational processes. Hardening of a system should be a decision of the enterprise to drive security alignment with the enterprise.

In addition, as the system is changed by gradual enforcement and hardening, new issues are detected and monitored. Hence, making a big bang decision may be not relevant to rising risks as they evolve. Prioritization according to value is the essence of this phase. It is a matter of what is important for the next immediate term, according to overall goals, yet considering changes to the environment.

With regard to the cyber resilience risk recommendation phase, a focus is to simplify approved changes and actions by proactive automation. In traditional systems, the action of IT remediation of security issues is either done by the security team (such as awareness and training), by creating a ticket in the IT service system (call for patch managements), and/or by tools that are triggered by security and monitored by IT (automatic deployment of security policies, change of authentication and authorization, self-service access control management, etc.). Some operations can be conducted in a disconnected mode, such as upgrading firmware on an IoT device, in which the operator needs to access the device directly. Either automated or manual, by IT or by security, or by internal or external teams, the entire changes are constantly assessed by the first phase of discovery phase, and re-projected as a metric in a context. Progress tracking of these changes should also occur in a gradual manner, indicating maintenance scheduling on similar operational processes, hence, driving recommendations for frequent actions that can be automated, and serve as candidates to self-managed by the operations owners and systems users.

In the agile security platform, acting is more than automating complex event processing (CEP) rules on alerts captured in the system logs and similar tools. Acting is started in areas highlighted according to known patterns and changing risks. Pattern detection and classification of events for approved automation processes (allocated transactions budget), are aimed at commoditization of security hardening actions in order to reduce the attention needed for prioritization. As such, a compound backlog and decision phase, can focus further on things that cannot be automated versus those that can. All issues not attended yet are highlighted, those that are handled by automation are indicated as such, and monitored to completion, with a potential additional value of increasing prioritization due to changing risks impact analysis.

Figure 2:
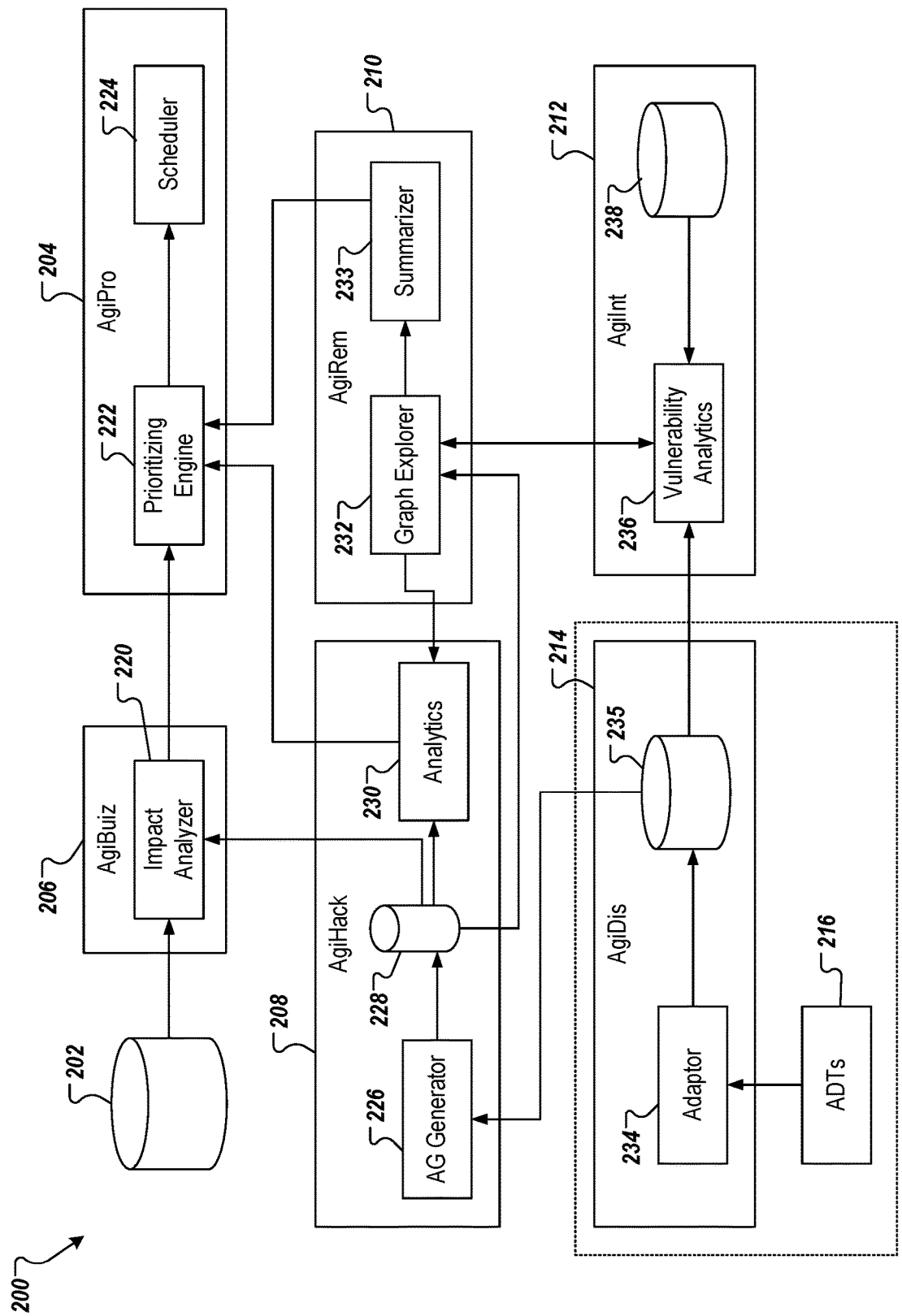
FIG. 2 depicts an example conceptual architecture of an agile security platform of the present disclosure.

FIG. 2 depicts an example conceptual architecture 200 of an agile security (AgiSec) platform. The AgiSec platform of FIG. 2 is discussed in detail in U.S. application Ser. No. 16/375,965, filed on Apr. 5, 2019, and entitled Leveraging Attack Graphs of Agile Security Platform, the disclosure of which is expressly incorporated herein by reference in the entirety. The conceptual architecture 200 depicts a set of security services of the AgiSec platform, which include: an agile security prioritization (AgiPro) service 204, an agile security business impact (AgiBuiz) service 206, an agile security remediation (AgiRem) service 210, an agile security hacker lateral movement (AgiHack) service 208, an agile security intelligence (AgiInt) service 212, and an agile security discovery (AgiDis) service 214. The conceptual architecture 200 also includes an operations knowledge base 202 that stores historical data provided for an enterprise network (e.g., the enterprise network 120).

In the example of FIG. 2, the AgiDis service 214 includes an adaptor 234, and an asset/vulnerabilities knowledge base 235. In some examples, the adaptor 234 is specific to an asset discovery tool (ADT) 216. Although a single ADT 216 is depicted, multiple ADTs can be provided, each ADT being specific to an IT/OT site within the enterprise network. Because each adaptor 234 is specific to an ADT 216, multiple adaptors 234 are provided in the case of multiple ADTs 216.

In some implementations, the AgiDis service 214 detects IT/OT assets through the adaptor 234 and respective ADT 216. In some implementations, the AgiDis service 214 provides both active and passive scanning capabilities to comply with constraints, and identifies device and service vulnerabilities, improper configurations, and aggregate risks through automatic assessment. The discovered assets can be used to generate an asset inventory, and network maps. In general, the AgiDis service 214 can be used to discover assets in the enterprise network, and a holistic view of network and traffic patterns. More particularly, the AgiDis service 214 discovers assets, their connectivity, and their specifications and stores this information in the asset/vulnerabilities knowledge base 235. In some implementations, this is achieved through passive network scanning and device fingerprinting through the adaptor 234 and ADT 216. The AgiDis service 214 provides information about device models.

In the example of FIG. 2, the AgiInt service 212 includes a vulnerability analytics module 236 and a threat intelligence knowledge base 238 (e.g., CVE, CAPEC, CWE, iDefence API, vendor-specific databases). In some examples, the AgiInt service 212 discovers vulnerabilities in the enterprise network based on data provided from the AgiDis service 214. In some examples, the vulnerability analytics module 236 processes data provided from the AgiDis service 214 to provide information regarding possible impacts of each vulnerability and remediation options (e.g., permanent fix, temporary patch, workaround) for defensive actions. In some examples, the vulnerability analytics module 236 can include an application programming interface (API) that pulls out discovered vulnerabilities and identifies recommended remediations using threat intelligence feeds. In short, the AgiInt service 212 maps vulnerabilities and threats to discovered IT/OT assets. The discovered vulnerabilities are provided back to the AgiDis service 214 and are stored in the asset/vulnerabilities knowledge base 235 with their respective assets.

In the example of FIG. 2, the AgiHack service 208 includes an analytical attack graph (AAG) generator 226, an AAG database 228, and an analytics module 230. In general, the AgiHack service 208 generates AAGs using the resource-efficient AAG generation of the present disclosure, and evaluates hacking exploitation complexity. In some examples, the AgiHack service 208 understands attack options, leveraging the vulnerabilities to determine how a hacker would move inside the network and identify targets for potential exploitation. The AgiHack service 208 proactively explores adversarial options and creates AAGs representing possible attack paths from the adversary's perspective.

In further detail, the AgiHack service 208 provides rule-based processing of data provided from the AgiDis service 214 to explore all attack paths an adversary can take from any asset to move laterally towards any target (e.g., running critical operations). In some examples, multiple AAGs are provided, each AAG corresponding to a respective target within the enterprise network. Further, the AgiHack service 208 identifies possible impacts on the targets. In some examples, the AAG generator 226 uses data from the asset/vulnerabilities knowledge base 235 of the AgiDis service 214, and generates an AAG. In some examples, the AAG graphically depicts, for a respective target, all possible impacts that may be caused by a vulnerability or network/system configuration, as well as all attack paths from anywhere in the network to the respective target. In some examples, the analytics module 230 processes an AAG to identify and extract information regarding critical nodes, paths for every source-destination pair (e.g., shortest, hardest, stealthiest), most critical paths, and critical vulnerabilities, among other features of the AAG. If remediations are applied within the enterprise network, the AgiHack service 208 updates the AAG.

In the example of FIG. 2, the AgiRem service 210 includes a graph explorer 232 and summarizer 233. In general, the AgiRem service 210 provides remediation options to avoid predicted impacts. For example, the AgiRem service 210 provides options to reduce lateral movement of hackers within the network and to reduce the attack surface. The AgiRem service 210 predicts the impact of asset vulnerabilities on the critical processes and adversary capabilities along kill chain/attack paths and identifies the likelihood of attack paths to access critical assets and prioritizes the assets (e.g., based on shortest, easiest, stealthiest). The AgiRem service 210 identifies remediation actions by exploring attack graph and paths. For example, the AgiRem service 210 can execute a cyber-threat analysis framework that characterizes adversarial behavior in a multi-stage cyber-attack process, as described in further detail herein.

In further detail, for a given AAG (e.g., representing all vulnerabilities, network/system configurations, and possible impacts on a respective target) generated by the AgiHack service 208, the AgiRem service 210 provides a list of efficient and effective remediation recommendations using data from the vulnerability analytics module 236 of the AgiInt service 212. In some examples, the graph explorer 232 analyzes each feature (e.g., nodes, edges between nodes, properties) to identify any condition (e.g., network/system configuration and vulnerabilities) that can lead to cyber impacts. Such conditions can be referred to as issues. For each issue, the AgiRem service 210 retrieves remediation recommendations and courses of action (CoA) from the AgiInt service 212, and/or a security knowledge base (not shown). In some examples, the graph explorer 232 provides feedback to the analytics module 230 for re-calculating critical nodes/assets/paths based on remediation options. In some examples, the summarizer engine 233 is provided as a natural language processing (NLP) tool that extracts concise and salient text from large/unstructured threat intelligence feeds. In this manner, the AgiSec platform can convey information to enable users (e.g., security teams) to understand immediate remediation actions corresponding to each issue.

In the example of FIG. 2, the AgiBuiz service 206 includes an impact analyzer 220. In general, the AgiBuiz service 206 associates services that are provided by the enterprise with IT/OT assets, generates a security map, identifies and highlights risks and possible impacts on enterprise operations and industrial processes, and conducts what-if prediction analyses of potential security actions remediations on service health levels. In other words, the AgiBuiz service 206 identifies risk for each impact predicted by the AgiHack service 208. In some examples, the impact analyzer 220 interprets cyber risks and possible impacts (e.g., financial risk) based on the relative importance of each critical asset and its relative value within the entirety of the enterprise operations. The impact analyzer 220 processes one or more models to compare the financial risks caused by cyber attacks with those caused by system unavailability due to shutdown time for replacing/patching critical assets.

In the example of FIG. 2, the AgiPro service 204 includes a prioritizing engine 222 and a scheduler 224. In some implementations, the AgiPro service 204 prioritizes the remediation recommendations based on their impact on the AAG size reduction and risk reduction on the value. In some examples, the AgiPro service 204 determines where the enterprise should preform security enforcement first, in order to overall reduce the risks discovered above, and evaluate and probability to perform harm based on the above lateral movements by moving from one CI to another. In some examples, the AgiPro service 204 prioritizes remediation actions based on financial risks or other implications, provides risk reduction recommendations based on prioritized remediations, and identifies and tracks applied remediations for risks based on recommendations.

In some examples, the prioritizing engine 222 uses the calculated risks (e.g., risks to regular functionality and unavailability of operational processes) and the path analysis information from the analytics module 230 to prioritize remediation actions that reduce the risk, while minimizing efforts and financial costs. In some examples, the scheduler 224 incorporates the prioritized CoAs with operational maintenance schedules to find the optimal time for applying each CoA that minimizes its interference with regular operational tasks.

In some implementations, the AgiSec platform of the present disclosure provides tools that enable user interaction with multi-dimensional (e.g., 2D, 3D) visualizations of computational graph data and its derived computed attributes. In some examples, topological heat maps can be provided and represent ranks and values of the derived attributes in order to expedite search capabilities over big data. In some examples, the tools also enable searching for key attributes of critical nodes, nodes representing CIs. In some implementations, these visualizations are provided within a computer or immersive environment, such as augmented reality (AR), mixed reality (MR), or virtual reality (VR). The visualizations of the present disclosure improve the ability of an automated (employing contour lines) or human interactive (based on segmented regional selection) to employ search and filtering capabilities on big data graph topology aimed at quickly identifying quickly critical nodes in the graph which its derived (computed) attributes serve as the search criteria. The attributes to be highlighted differ and are configurable, as such, different contour lines appear based on different criteria. In some examples, the perceived importance of an attribute relative to other attributes can be controlled in view of a scenario, vertical importance, or any domain-specific consideration, through weighed attributes. Further, similar contour lines can be identified in other nearby nodes on the graph. For an immersive visualization experience, matching leading contour lines can show hidden paths, or pattern of similar geometric shape and form, hence drive improved comprehension for humans.

In the context of cyber security, a critical node, also referred to herein as cardinal node, can represent a CI that is a key junction for lateral movements within a segmented network. Namely, once acquired as a target, the cardinal node can trigger multiple new attack vectors. Cardinal nodes can also be referred to as "cardinal faucet nodes." Another node will be one that many hackers' lateral movements can reach, yet it cannot lead to an additional node. Such nodes can be referred to as "cardinal sink nodes." In the network graph, the more edges from a cardinal faucet node to other nodes, the higher the faucet attribute is. The more incoming edges to a cardinal node, the higher the sink attribute is. If a node has both sink and faucet values in correlation, the more overall cardinal this node becomes to the entire examined graph topology and is defined as a critical target to be acquired since it provides control over multiple nodes in the graphs. In certain situations, the search for a faucet attribute is more important than a sink attribute. Such as a case of finding what node to block first to prevent a segregation of an attack outbreak. In case of finding what is very hard to protect, the more sink attributes matter more.

Figure 3:
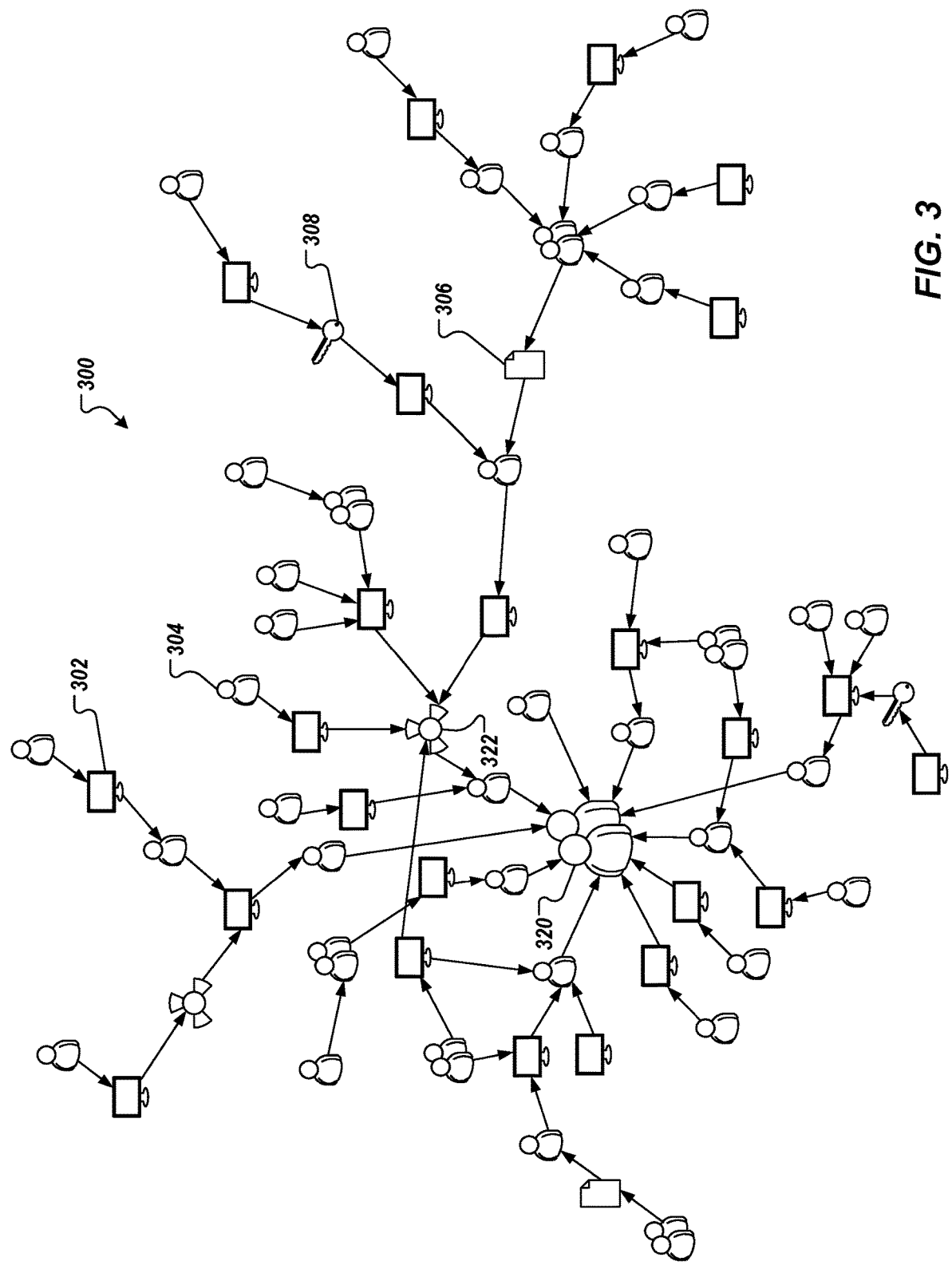
FIG. 3 depicts an example visualization of a portion of an enterprise network.

FIG. 3 depicts an example visualization 300 of a portion of an enterprise network. In some implementations, the visualization 300 is provided based on the network topology of the enterprise network. For example, the AgiHack service 208 of FIG. 2 can generate one or more visualizations based on information provided from the AgiDis service 214. In some examples, a visualization includes nodes and edges (also referred to as arches) between nodes. In some examples, a node can be associated with a semantic type. In the example domain of cyber-security and network topology, example semantic types can include, without limitation, computer 302, user 304, file 306, and key 308.

In some examples, an edge can include an incoming (sink) edge (e.g., an edge leading into a node from another node) or an outgoing (faucet) edge (e.g., an edge leading from a node to another node). In some examples, each edge can be associated with a respective activity. In the example domain of cyber-security and network topology, example activities can include, without limitation, logon (credentials), operating system access, and memory access. In some examples, each edge can be associated with a respective weight. In some examples, the weight of an edge can be determined based on one or more features of the edge. Example features can include a traffic bandwidth of the edge (e.g., how much network traffic can travel along the edge), a speed of the edge (e.g., how quickly traffic can travel from one node to another node along the edge), a difficulty to use the edge (e.g., network configuration required to use the edge), and a cost to use the edge (e.g., in terms of technical resources, or financial cost). In some examples, and as described in further detail below, the weights of the edges are determined relative to each other (e.g., are normalized to 1).

In some implementations, each node can be associated with a set of attributes. Example attributes can include, without limitation, the semantic type of the node, a number of incoming edges, a number of outgoing edges, a type of each of the edges, a weight of each of the edges, and the like. In some implementations, one or more values for a node can be determined based on the set of attributes of the node, as described in further detail herein.

The example visualization 300 includes tens of nodes (approximately 70 nodes in the example of FIG. 3). It is contemplated, however, that a visualization can include hundreds, or thousands of nodes. In some examples, the example visualization 300 is generated based on one or more filter parameters. In some examples, a user can define filter parameters that can be used to identify cardinal nodes within an enterprise network, and segments of the enterprise network that may be relevant to a cardinal node. In the example of FIG. 3, a node 320 can be determined to be a cardinal node based on one or more filter parameters (e.g., no outgoing edges, and more than three incoming edges). In some examples, other depicted nodes include nodes along lateral paths that lead to a cardinal node.

In the example of FIG. 3, the node 320 can represent administrator credentials, a relatively high-value target within an enterprise network, and all other edges and nodes define the paths within the enterprise network that lead to the node 320. While the enterprise network can include hundreds, or thousands of nodes and edges, the example visualization 300 is provided based on identification of the node 320 as the cardinal node (e.g., based on filter parameters) and all paths of the enterprise network that lead to the node 320. In this manner, the portion 320 provides a more easily consumable visualization than depicting an entirety of the enterprise network.

In some implementations, other nodes besides the cardinal node can be identified as relatively important nodes (e.g., relative to other depicted nodes). In some examples, the relative importance of a node can be determined based on attack paths that lead to a cardinal node. In the example of FIG. 3, a node 322 can be determined to be a relatively important node. Starting from the node 322, there is a single attack path to the node 320. However, there are approximately ten different attack paths that the node 322 is included in. Consequently, security resources could be concentrated on the node 322, as opposed to nodes upstream of the node 322 in the multiple attack paths. In this manner, security resources can more efficiently protect the node 320, as described in further detail herein.

Further, enterprise networks (and thus, resulting AAGs) can change over time. That is, there is a multi-dimensional aspect to enterprise networks with one dimension including time. For example, and with continued reference to the example of FIG. 3, the node 320 can be considered a cardinal node based on the filter parameters. At another time, the node 320 might no longer be considered a cardinal node. For example, between the first time and the second time, values of attributes may have changed for nodes, some nodes may have been removed from the network (e.g., computers retired, users removed), and/or some nodes may have been added to the network (e.g., new computers/users).

As introduced above, implementations of the present disclosure are directed to providing attack graphs to determine asset vulnerability of enterprise-wide assets and providing time-based graph values to monitor effectiveness of security controls. To provide context, enterprises implement different cyber security controls in order to mitigate and avoid exposure to cyber security risks. In many cases tens or hundreds of different types of controls, from specific configuration enforcement, through implementation of defensive solutions (e.g., anti-virus and EDRs, operator behavioral policies, best practices) are implemented. Such cyber security controls can also be referred to herein as controls, security controls, security measures, remedial measures, and the like.

Example security control include, without limitation, those provided in the ISO/IEC 27001. To illustrate this principle with an example, MITRE ATT&K tactic T1175 can be considered, which defines a lateral movement of a hacker from one machine to another by utilizing MS Windows Distributed COM (DCOM) infrastructure. To use this tactic, an adversary must acquire a user account with certain privileges. Such an account should be from a member of the DCOM group on a host machine. Consequently, the hacker can perform a Remote Procedure Call (RPC) over the network to a target machine. In addition, the target machine must be listening on a predefined set of ports supported by DCOM infrastructure. To mitigate the exposure to this type of attack, MITRE offers several tactics that we map to ISO/IEC 27001 standard. Namely, MITRE T1175 requirements are to implement three mitigations, in which a security expert may need to implement several security controls. In the case of T1175, the security expert may opt to implement an Access Control Policy (A911), an Access to Networks and Network Services Policy (A912), and a Segregation in Networks Policy (A1313). By implementing even one of these three security controls, a defender can eliminate these potential lateral movements. Accordingly, the conditional logic is an AND relation between the policies.

Measuring the effectiveness of the different controls over time is necessary. For example, implementing each control requires technical resources and budget. Consequently, return on investment in terms effectiveness of respective controls needs to be validated. As another example, over time, the effectiveness of different security control might change, (increase or decrease) as a result of changing threats, deterioration of internal security habits and policies, architectural changes, and the like. As another example, some security controls might have been not implemented/utilized properly to begin with, in fact making them irrelevant and an unnecessary expenditure of technical resources (e.g., processors, memory, bandwidth) in implementing such controls.

In view of this, implementations of the present disclosure provide for measuring effectiveness of security controls over time, reporting effectiveness and tracing gaps to a granular level (e.g., individual security controls). As described in further detail herein, each vulnerability (security issue) can be tagged to a corresponding security control, which has been implemented to address the vulnerability. A graph value (GV) that represents the "hackability" of a network represented by an AAG is determined by summing up the complexity of all of the different lateral movements and offensive actions possible in an instance of the AAG. In some examples, an instance of an AAG is an AAG at a specific time. In some examples, an AAG is generated by a cyber-security platform, such as the AgiSec platform described herein. In mathematical terms, an AAG can be described as a directed graph modeled as G(V, E) with a set of nodes V={$v_1, \ldots, v_n$} and a set of edges E={$e_1, \ldots, e_m$} connecting nodes together, where |V|=n and |E|=m. AAGs are described in further detail below.

As described herein, a set of GVs can be calculated for an enterprise network over time to assess the effectiveness of one or more security controls that are implemented to address a vulnerability. In accordance with implementations of the present disclosure, each GV in the set of GVs is determined for a respective AAG. In some examples, granularity is achieved based on a size of the AAG. For example, the larger the AAG (e.g., representing multiple components within the enterprise network), the less granular the respective GV is. That is, the larger the AAG, the more components and security controls are accounted for in the resulting GV. Accordingly, the smaller the AAG (e.g., representing few components or a single component within the enterprise network), the more granular the respective GV is. That is, the smaller the AAG, the fewer components and security controls are accounted for in the resulting GV.

As described in further detail, a set of AAGs can be provided for an enterprise network, each AAG being generated at a respective time. In some examples, AAGs can be generated at a pre-defined period of time (e.g., hourly, daily, weekly) to provide the set of AAGs. In some examples, a GV is calculated for each AAG to provide the set of GVs. In some examples, the GV value for a respective AAG is calculated in response to generation of the respective AAG. In this example, GVs are generated at the same rate (e.g., pre-defined period of time) as AAGs. The GVs in the set of GVs can be monitored over time to determine an effectiveness of the one or more security controls. In some examples, if the effectiveness does not meet an expected effectiveness, one or more additional security controls can be implemented. In some examples, if the effectiveness does not meet an expected effectiveness, the one or more security controls that had been originally implemented can be halted and/or reversed.

In some implementations, a graph is plotted that depicts the hackability (graph value) over time, and the graph can be used to monitor and evaluate changes (e.g., in security controls). In some examples, ascents/descents/plateaus on the graph can be correlated to the vulnerabilities that affect the hackability level. For example, a continuous ascent over time indicates that vulnerabilities are piling up and not being treated by security controls or security controls are failing. As another example, a plateau can indicate that a specific vulnerability type is not being addressed by a security control or that a security control is failing to appropriately address the vulnerability. Accordingly, implementations of the present disclosure transform security operations from tactical responses to a strategical process. Further, implementations of the present disclosure enable optimization of security investments by creating smart insights regarding the utilization of current controls and optimization of security operations.

In further detail, and as introduced above, implementations of the present disclosure provide a graph value (GV) as a metric that represents a risk that a process (P) is facing. That is, GV represent how difficult it is to compromise one or more assets in a network that would be detrimental to the process. In order to calculate the GV of a process, an AAG is used to determine a set of assets (e.g., one or more assets) that support the process. For each asset, possible impacts on the asset and how much risk each impact would cause on the entire process are also determined. The following formula provides a non-limiting example of determining a GV for a process:

$$GV = \sum_{i=1}^{N} EV_i * e^{-\frac{H_i}{\alpha}} \quad (1)$$

where N is the number of impacts in the AAG, i∈[1 . . . N], $EV_i$ is an Eigenvector centrality for the impact with index i, $H_i$ is a hardness (difficulty) of arriving from outside (e.g., through the Internet into the network) to impact i, and α is an empirically chosen value (e.g., 7) used to normalize the value of the power of e. In accordance with implementations of the present disclosure, GV is calculated on the AAG based on rule nodes and impact nodes, as described in further detail herein. In general, the Eigenvector centrality is a measure of the influence a node has on a network (e.g., if a node is pointed to by many nodes (which also have high Eigenvector centrality) then that node will have high eigenvector centrality). In some examples, configuration nodes of the AAG are not used in determining GV (e.g., configuration nodes provide metadata for rule nodes).

Figure 4:
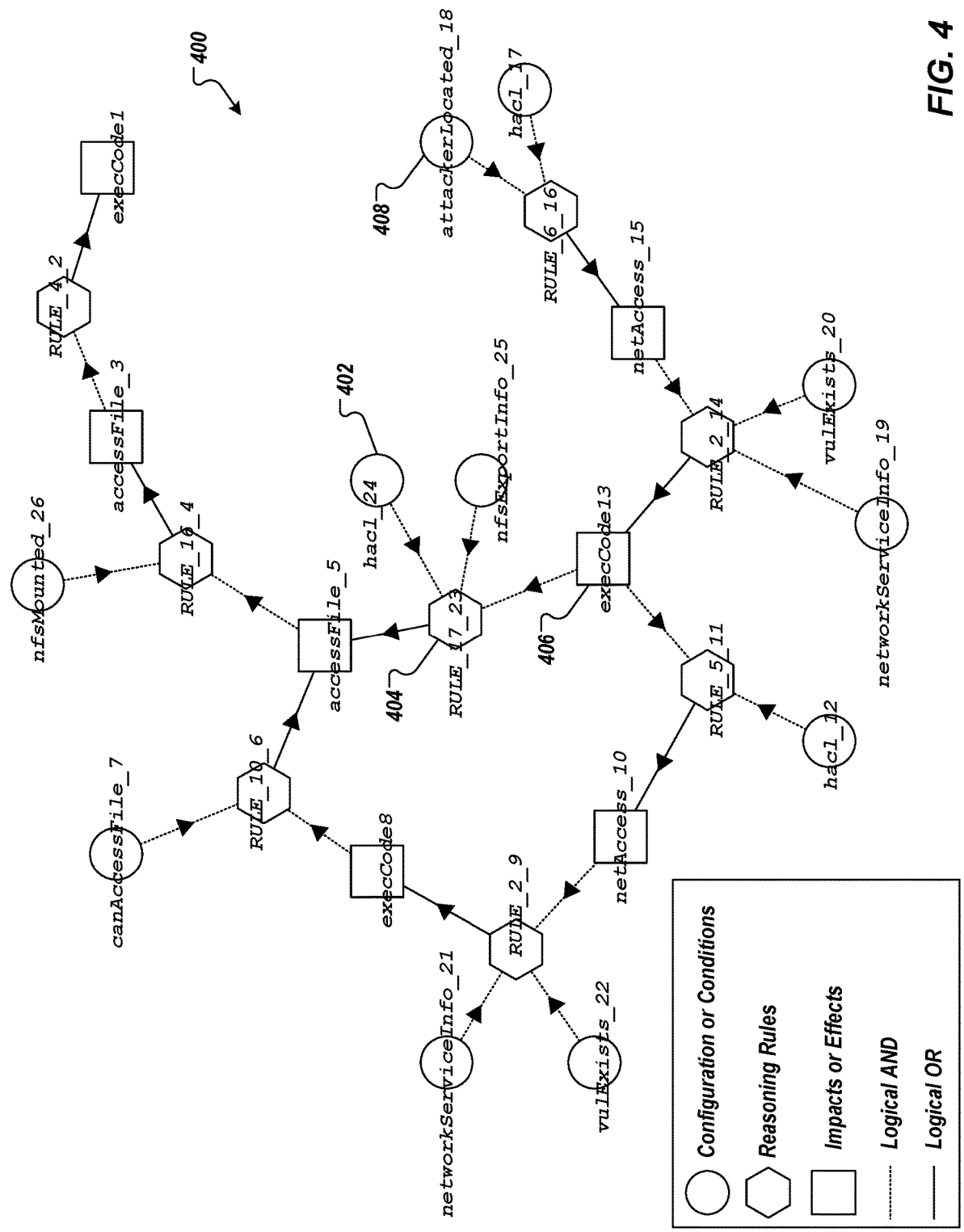
FIG. 4 depicts an example analytical attack graph in accordance with implementations of the present disclosure.

FIG. 4 depicts an example AAG 400 in accordance with implementations of the present disclosure. The example AAG 400 includes configuration nodes 402, rule nodes 404, and impact nodes 406. The example AAG 400 is referenced here by way of non-limiting example in describing implementations of the present disclosure.

As depicted in the example of FIG. 4, the AAG can include different node types to show how a set of network and system configurations result in unauthorized actions to specific targets. The example AAG 400 is depicted in a database structure (e.g., Neo4j graph database structure). Nodes in an AAG are of different types: circular nodes representing system or network configurations that are the conditions that provide possibilities for actions by an attacker; hexagonal nodes representing reasoning rules that represent the attack methodology leveraged by an attacker to achieve a particular goal; and square nodes that represent an impact as a sub-goal for a certain action an attacker could take. An AAG includes two types of edges: configuration-to-rule edges that represent logical AND (i.e., all configuration conditions have to be true to cause the impact; and rule-to-impact edges that represent logical OR (i.e., the impact happens if at least one rule is satisfied).

In general, an AAG is created by taking into account the configurations directed by some rules in order to make some impacts on the target network. In some examples, all configuration nodes, impact nodes, and rule nodes can be provided in sets C, I, R, respectively. Accordingly, C={$c_j|c_j \in V$, $\forall c_j$ is a configuration}, I={$i_j|i_j \in V$, $\forall i_j$ is an impact}, and R={$r_j|r_j \in V$, $\forall r_j$ is a rule}. Consequently, the combination of these sets accounts for all vertices of the graph G (i.e., V={C, I, R}).

As introduced above, AAGs can be used in cyber-threat analysis to determine attack paths of external attackers into and through a computer network. Example use of AAGs in mitigating attacks on computer networks is described in further detail in commonly assigned U.S. application Ser. No. 16/554,846, entitled Generating Attack Graphs in Agile Security Platforms, and filed on Aug. 29, 2019, the disclosure of which is expressly incorporated herein by reference in the entirety for all purposes. Example generation of AAGs is also described in further detail in commonly assigned U.S. application Ser. No. 16/924,483, entitled Resource-efficient Generation of Analytical Attack Graphs, and filed on Jul. 9, 2020, the disclosure of which is expressly incorporated herein by reference in the entirety for all purposes.

As described in detail herein, implementations of the present disclosure are directed to determining effectiveness of security controls in addressing vulnerabilities based on GVs calculated based on AAGs. Implementations of the present disclosure are described in further detail herein with example reference to the AAG 400 of FIG. 4. It is contemplated, however, that implementations of the present disclosure can be realized with any appropriate AAG.

In the example of FIG. 4, a three-node sub-network is provided, which supports a process, for which a set of GVs is to be determined. The sub-network includes a workstation (Workstation) that is supporting the process, and a file access (accessFile) and a code execution (codeExecution) put risk on the workstation. In some examples, the risk reflects the risk of malicious intrusion to the workstation through each of the file access and the code execution. In some examples, risk can be partitioned among impacts (e.g., accessFile, codeExecution). In the current example, a first impact (e.g., accessFile) includes X % risk and a second impact (e.g., codeExecution) includes Y % risk on the workstation. In some examples, the sum of the risks can be less than, equal, or greater than 100%. In some examples, when all impacts occur, the risk is 100%. For purposes of illustration, and by non-limiting example, it is provided that the summation of the risks of all impacts is equal to 100%.

In some implementations, the risk imposed by an impact i to the entire process is calculated as:

$$\text{Risk}_i = f_i \times \text{Contribution}_i \tag{2}$$

where $f_i = e^{-H_i/\alpha}$ and is a hardness factor of impact i. In some examples, the hardness factor represents a difficulty to cause the impact. As noted above, α is tuning parameter (e.g., α=1 ... 10, α=7). Accordingly, the harder an impact (an attack) is to make happen, the lower the risk is on the process. If, for example, it is very easy to launch the attack and cause the impact, then the entire impact contribution/influence (for example X %) is expected to occur to the process. For a given AAG (e.g., the three-node sub-graph introduced above) $H_i$ is calculated for all of the impacts.

In accordance with implementations of the present disclosure, the hardness ($H_i$) of all entry point impacts (e.g., those starting with attackerLocated, such as the node 408 of FIG. 4) using the hardness value of a respective rule that is provided by an attack generation engine (e.g., a provided rule engine). For any other impact in the graph, if the impact is directly caused by a previous impact only (e.g., exec-Code_13 in FIG. 4) and not multiple impacts (e.g., access-File_5 in FIG. 4), the hardness value of the respective rule ($H_R$) is added to the hardness value of the previous impact. For example:

$$H_i = H_{R_i} + H_{i-1} \tag{3}$$

If there are multiple rules causing the impact (e.g., access-File_5 in FIG. 4) the paths to the impact are separated and the hardness value of each path is calculated as above (e.g., add the hardness value of the respective rule to the hardness value of the previous impact) and the equation below is used to integrate the hardness values of the impact based on all paths $$\left(\frac{1}{H_i} = \frac{1}{H_{P_1}} + \frac{1}{H_{P_2}} + ...\right); H_i = \tag{4}$$

$$f(H_{P_1}, H_{P_2}, ...) = \frac{1}{\frac{1}{H_{P_1} + H_{R_{1-i}}} + \frac{1}{H_{P_2} + H_{R_{2-i}}} + ...}$$

In some examples, it can be provided that the hardness of all reasoning rules is equal to 1.

Using the process described above, the following example calculations can be provided based on the AAG 400 of FIG. 4:

$$H_{(netAccess\_15)}=1$$

$$H_{(execCode13)}=2$$

$$H_{(netAccess\_10)}=3$$

$$H_{(execCode8)}=4$$

$$H_{(accessFile\_5)}=1/[[1/(H_{(execCode13)}+1)]+\\ [1/(H_{(execCode8)}+1)]]=1/[[1/(2+1)]+[1/(4+1)]]=1/\\ [1/3+1/5]=1/(8/15)=15/8=1.875$$

Consequently, the total risk imposed by the impacts on the workstation in the above-described three-node example are provided as:

$$Risk_{impact\ 3}=e^{-2.875/\alpha}\times Y\% \text{ (or } X\%)$$

$$Risk_{impact\ 1}=e^{-3.875/\alpha}\times X\% \text{ (or } Y\%)$$

$$\text{Total Risk}=Risk_{impact\ 1}+Risk_{impact\ 3}$$

In accordance with implementations of the present disclosure, and as introduced above, a graph value (GV) is calculated for each instance of an AAG, an instance corresponding to a respective time. In this manner, a profile of GVs can be provided as a plot of GVs over time. That is, the hardness values of respective impacts can be used to calculate each GV (for a respective instance of an AAG) (e.g., using Equation 1 provided above). As also introduced above, each vulnerability (security issue) issue can be tagged to a corresponding security control, and a time at which the security control was implemented is known. Consequently, implementation of the security control (and, hence, the respective vulnerability) can be referenced to the profile of the GV to determine whether the GV changed (e.g., in response to the security control).

In further detail, one or more security controls can be implemented in response to a vulnerability identified within an enterprise network. A set of AAGs can be generated, each AAG being generated at a respective time, and a GV is calculated for each AAG to provide a set of GVs. In some examples, the GVs can be monitored over time to determine whether the one or more security controls are effective in addressing the vulnerability (e.g., mitigating risk presented by the vulnerability). In some examples, if the effectiveness does not meet an expected effectiveness, one or more additional security controls can be implemented. In some examples, if the effectiveness does not meet an expected effectiveness, the one or more security controls that had been originally implemented can be halted and/or reversed.

In some examples, determining effectiveness is by using regular trends analysis of propagating graphs. Namely, analysis of shapes: diverging, converging, or maintaining shapes. Analysis of frequency of changes and analysis of magnitude can be used as well as a combination of the above-defined patterns. Each system user can define their level of threshold or trend that they would like to monitor and observe. For example, the rate of change of the GV be determined for a period of time, and if the rate exceeds a threshold rate an indication of effectiveness can be provided (e.g., ineffective if GV increasing (heightened alert for rate of increase exceeding a threshold level; effective, if GV decreasing). As another example, some matching to determine whether the profile (e.g., as depicted in FIG. 5 below) matches a first profile indicating effective, or a second profile indicating ineffective (or danger).

Figure 5:
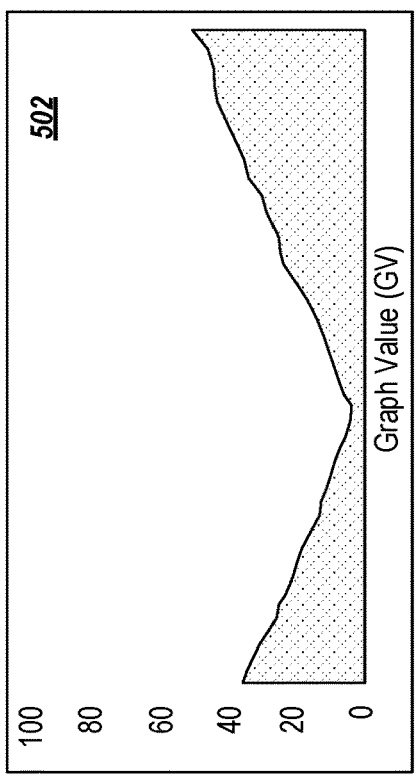
FIG. 5 depicts example network security profiles determined in accordance with implementations of the present disclosure.
Figure 5:
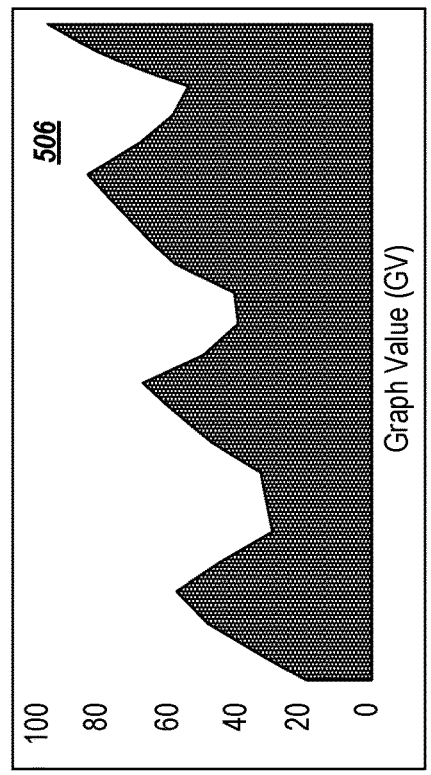
Figure 5:
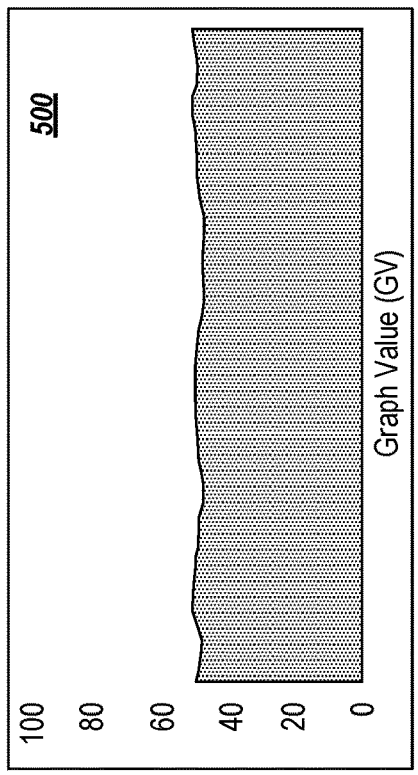
Figure 5:
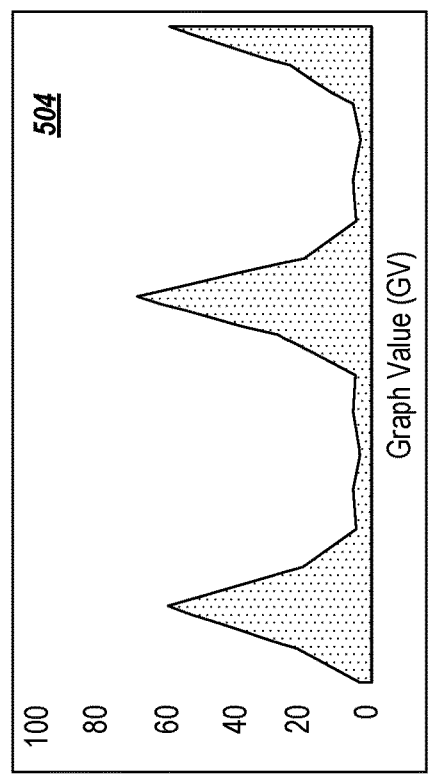

FIG. 5 depicts example network security profiles 500, 502, 504, 506 determined in accordance with implementations of the present disclosure. Each of the security profiles is provided as a plot of GVs over time and represent the effectiveness (or lack thereof) of security controls on the network.

In the example of FIG. 5, the network security profile 500 indicates that the GV is relatively constant over time at a relatively high-level. This can indicate that security controls are not effective in mitigating the relatively high risk within the enterprise network, because the GVs do not decrease over time. In response, one or more additional security controls can be implemented and/or the one or more security controls that had been originally implemented can be halted and/or reversed.

In the example of FIG. 5, the network security profile 502 indicates that the GVs are climbing without response and/or any response is slow. This can indicate that security controls are not efficient in mitigating the risk within the enterprise network. In response, one or more additional security controls can be implemented and/or the one or more security controls that had been originally implemented can be halted and/or reversed.

In the example of FIG. 5, the network security profile 504 indicates that the GVs rapidly decrease as threats within the enterprise network arise. For example, at each peak, or sometime prior to each peak, a security control can be implemented to address a vulnerability. The network security profile 504 can indicate that security controls are effective in mitigating the risk within the enterprise network.

In the example of FIG. 5, the network security profile 506 indicates that the GV temporarily decreases as threats appear, but again increases each time indicating that the risk is increasing faster than response and the risk is accumulating. This can indicate that security controls are not effective in mitigating the risk within the enterprise network. In response, one or more additional security controls can be implemented and/or the one or more security controls that had been originally implemented can be halted and/or reversed.

Figure 6:
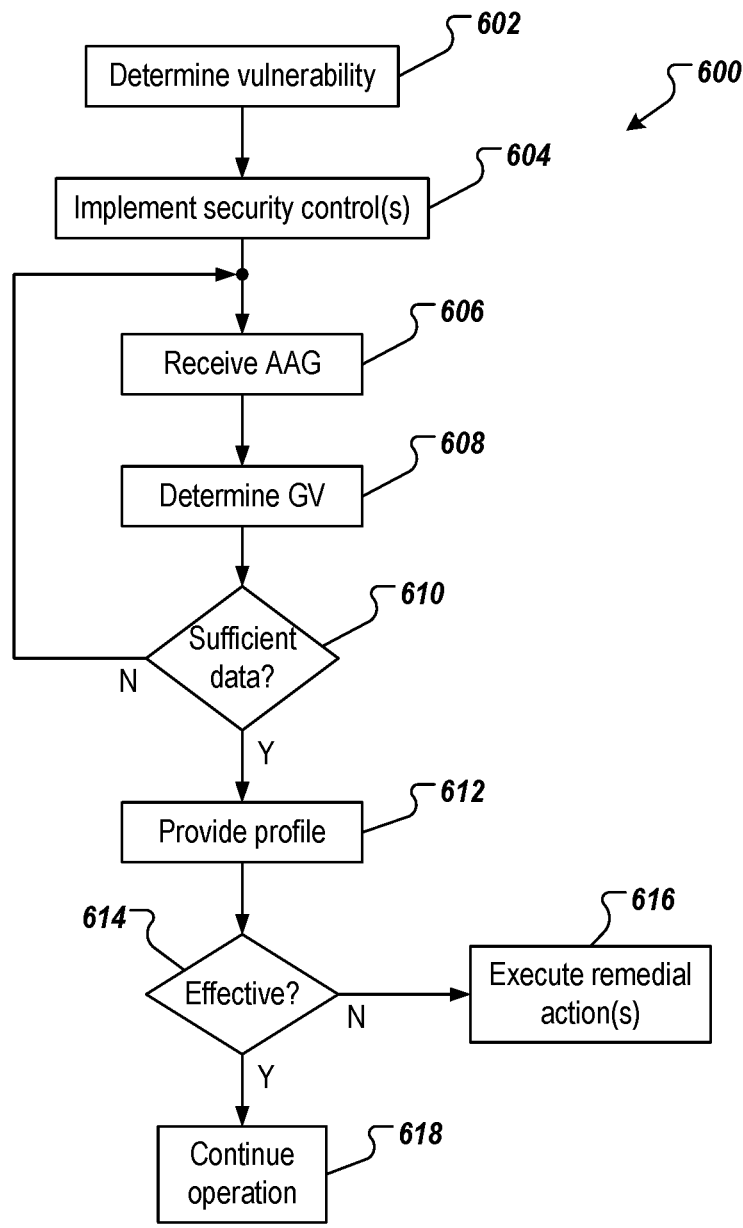
FIG. 6 depicts an example process that can be executed in accordance with implementations of the present disclosure.

FIG. 6 depicts an example process 600 that can be executed in accordance with implementations of the present disclosure. In some implementations, the example process 600 may be performed using one or more computer-executable programs executed using one or more computing devices. The example process 600 can be performed for security of enterprise networks.

A vulnerability is determined (602). For example, a vulnerability associated with a component in an enterprise network can be identified. This can be achieved, for example, by the AgiInt service 212, which discovers vulnerabilities in the enterprise network based on data provided from the AgiDis service 214, as described herein with reference to FIG. 2. One or more security controls are implemented (604). For example, for a given vulnerability, one or more security controls that are designed to address the vulnerability can be implemented. This can be achieved, for example, by the AgiPro service 204, as described herein with reference to FIG. 2. An example security control can include, without limitation, executing a patch to an operating system within the enterprise network to address a security hole.

An AAG is received (606). For example, an AAG is generated and is representative of a relevant portion of the enterprise network. In some examples, the relevant portion of the enterprise network includes components that are associated with the one or more security controls that had been implemented (e.g., a component, on which a security control is implemented; a component affected by a security control). A GV is determined (608). For example, and as described herein, a GV is calculated for the AAG using Equation 1. The GV is included in a set of GVs that is to be used to determine the effectiveness of the one or more security controls.

It is determined whether sufficient data is available (610). For example, a sufficient number of GVs need be included in the set of GVs in order to accurately access effectiveness of the one or more security controls. For example, a single GV would be insufficient to accurately access effectiveness of the one or more security controls. In some examples, whether sufficient data is available can be determined based on a number of GVs included in the set of GVs. For example, if the number of GVs included in the set of GVs meets a threshold number, it can be determined that sufficient data is available. In some examples, whether sufficient data is available can be determined based on a time since the one or more security controls were implemented. For example, if the time since the one or more security controls were implemented meets a threshold time, it can be determined that sufficient data is available. If it is determined that sufficient data is not available, the example process loops back 600 to receive a next AAG (e.g., for next time period) and respective GV.

If it is determined that sufficient data is available, a profile is provided (612). For example, and as described herein, a profile can be generated based on the set of GVs, the profile indicating a change in GVs over time. It is determined whether the one or more security controls are effective in addressing the vulnerability (614). For example, and as described herein with reference to FIG. 5, the profile indicates an effectiveness of the one or more security controls. In some examples, if the profile indicates that the GVs increase over time, the one or more security controls are determined to be ineffective. In some examples, if the profile indicates that the GVs decrease over time, the one or more security controls are determined to be ineffective.

If the one or more security controls are not effective in addressing the vulnerability, one or more remedial actions are executed (616). Example remedial measures can include, without limitation, rolling back at least one security control of the one or more security controls, implementing at least one additional security control. If the one or more security controls are effective in addressing the vulnerability, operation of the enterprise network continues (618). In some examples, GVs can continue to be determined as the enterprise network continues to operate in order to assess any instances of deterioration of security controls over a longer period of time that could indicate vulnerabilities arising within the enterprise network.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for security of enterprise networks, the method being executed by one or more processors and comprising:
   receiving, from an agile security platform, analytical attack graph (AAG) data representative of one or more AAGs, each AAG representing one or more lateral paths within an enterprise network for reaching a target asset from one or more assets within the enterprise network;
   determining, for each instance of a plurality of instances of the AAG, a graph value representing a measure of hackability of the enterprise network at respective times;
   providing a profile of the enterprise network based on a set of graph values determined for instances of the AAG, the profile representing changes in graph values over time;
   determining an effectiveness of one or more security controls based on the profile, including determining that the one or more security controls are ineffective in response to graph values in the set of graph values increasing over time after implementation of the one or more security controls; and
   selectively executing one or more remedial actions in response to the effectiveness.

2. The method of claim 1, wherein each graph value in the set of graph values is calculated as:

$$GV = \sum_{i=1}^{N} EV_i * e^{-\frac{H_i}{\alpha}}$$

where N is a number of impacts in a respective AAG, i∈[1 . . . N], $EV_i$ is an Eigenvector centrality for an impact with index i, $H_i$ is a hardness value representing a difficulty of arriving to impact i, and α is an empirical value.

3. The method of claim 2, wherein $H_i$ is calculated as:

$$H_i = H_{R_i} + H_{i-1}$$

where $H_{R_i}$ is a hardness value representing a difficult in meeting a rule (R) to arrive at impact i from impact i−1.

4. The method of claim 2, wherein $H_i$ is calculated as:

$$H_i = \cfrac{1}{\cfrac{1}{H_{P_1} + H_{R_{1-i}}} + \cfrac{1}{H_{P_2} + H_{R_{2-i}}} + \ldots}$$

where $H_{P_1}$ and $H_{P_2}$ are hardness values of respective paths to impact i within the respective AAG indicating difficulty in moving along the respective paths, and $H_{R_{1-i}}$ and $H_{R_{2-i}}$ are hardness values of respective rules (R) to arrive at impact i within the respective AAG indicating difficulty in meeting the respective rules to move along the respective paths.

5. The method of claim 1, wherein the one or more remedial actions comprise one or more of rolling back at least one security control of the one or more security controls, and implementing at least one additional security control.

6. The method of claim 1, wherein the one or more security controls comprise one or more security controls provided in ISO/IEC 27001.

7. One or more non-transitory computer-readable storage media coupled to one or more processors and having instructions stored thereon which, when executed by the one or more processors, cause the one or more processors to perform operations for security of enterprise networks, the operations comprising:

receiving, from an agile security platform, analytical attack graph (AAG) data representative of one or more AAGs, each AAG representing one or more lateral paths within an enterprise network for reaching a target asset from one or more assets within the enterprise network;

determining, for each instance of a plurality of instances of the AAG, a graph value representing a measure of hackability of the enterprise network at respective times;

providing a profile of the enterprise network based on a set of graph values determined for instances of the AAG, the profile representing changes in graph values over time;

determining an effectiveness of one or more security controls based on the profile, including determining that the one or more security controls are ineffective in response to graph values in the set of graph values increasing over time after implementation of the one or more security controls; and selectively executing one or more remedial actions in response to the effectiveness.

8. The computer-readable storage media of claim 7, wherein each graph value in the set of graph values is calculated as:

$$GV = \sum_{i=1}^{N} EV_i * e^{-\frac{H_i}{\alpha}}$$

where N is a number of impacts in a respective AAG, $i \in [1 \ldots N]$, $EV_i$ is an Eigenvector centrality for an impact with index i, $H_i$ is a hardness value representing a difficulty of arriving to impact i, and $\alpha$ is an empirical value.

9. The computer-readable storage media of claim 8, wherein $H_i$ is calculated as:

$$H_i = H_{R_i} + H_{i-1}$$

where $H_{R_i}$ is a hardness value representing a difficult in meeting a rule (R) to arrive at impact i from impact i−1.

10. The computer-readable storage media of claim 8, wherein $H_i$ is calculated as:

$$H_i = \cfrac{1}{\cfrac{1}{H_{P_1} + H_{R_{1-i}}} + \cfrac{1}{H_{P_2} + H_{R_{2-i}}} + \ldots}$$

where $H_{P_1}$ and $H_{P_2}$ are hardness values of respective paths to impact i within the respective AAG indicating difficulty in moving along the respective paths, and $H_{R_{1-j}}$ and $H_{R_{2-j}}$ are hardness values of respective rules (R) to arrive at impact i within the respective AAG indicating difficulty in meeting the respective rules to move along the respective paths.

11. The computer-readable storage media of claim 7, wherein the one or more remedial actions comprise one or more of rolling back at least one security control of the one or more security controls and implementing at least one additional security control.

12. The computer-readable storage media of claim 7, wherein the one or more security controls comprise one or more security controls provided in ISO/IEC 27001.

13. A system, comprising:

one or more processors; and a computer-readable storage device coupled to the one or more processors and having instructions stored thereon which, when executed by the one or more processors, cause the one or more processors to perform operations for security of enterprise networks, the operations comprising:

receiving, from an agile security platform, analytical attack graph (AAG) data representative of one or more AAGs, each AAG representing one or more lateral paths within an enterprise network for reaching a target asset from one or more assets within the enterprise network;

determining, for each instance of a plurality of instances of the AAG, a graph value representing a measure of hackability of the enterprise network at respective times;

providing a profile of the enterprise network based on a set of graph values determined for instances of the AAG, the profile representing changes in graph values over time;

determining an effectiveness of one or more security controls based on the profile, including determining that the one or more security controls are ineffective in response to graph values in the set of graph values increasing over time after implementation of the one or more security controls; and selectively executing one or more remedial actions in response to the effectiveness.

14. The system of claim 13, wherein each graph value in the set of graph values is calculated as:

$$GV = \sum_{i=1}^{N} EV_i * e^{-\frac{H_i}{\alpha}}$$

where N is a number of impacts in a respective AAG, $i \in [1 \ldots N]$, $EV_i$ is an Eigenvector centrality for an impact with index i, $H_i$ is a hardness value representing a difficulty of arriving to impact i, and $\alpha$ is an empirical value.

15. The system of claim 14, wherein $H_i$ is calculated as:

$$H_i = H_{R_i} + H_{i-1}$$

where $H_{R_i}$ is a hardness value representing a difficult in meeting a rule (R) to arrive at impact from impact i−1.

16. The system of claim 14, wherein $H_i$ is calculated as:

$$H_i = \cfrac{1}{\cfrac{1}{H_{P_1} + H_{R_{1-i}}} + \cfrac{1}{H_{P_2} + H_{R_{2-i}}} + \ldots}$$

where $H_{P_1}$ and $H_{P_2}$ are hardness values of respective paths to impact i within the respective AAG indicating difficulty in moving along the respective paths, and $H_{R_{1-j}}$ and $H_{R_{2-j}}$ are hardness values of respective rules (R) to arrive at impact within the respective AAG indicating difficulty in meeting the respective rules to move along the respective paths.

17. The system of claim 13, wherein the one or more remedial actions comprise one or more of rolling back at least one security control of the one or more security controls and implementing at least one additional security control.

18. The system of claim 13, wherein the one or more security controls comprise one or more security controls provided in ISO/IEC 27001.

* * * * *

UNITED STATES PATENT AND TRADEMARK OFFICE
CERTIFICATE OF CORRECTION

| | | |
|---|---|---|
| PATENT NO. | : 11,695,795 B2 | Page 1 of 1 |
| APPLICATION NO. | : 16/925583 | |
| DATED | : July 4, 2023 | |
| INVENTOR(S) | : Eitan Hadar and Dani Grabois | |

It is certified that error appears in the above-identified patent and that said Letters Patent is hereby corrected as shown below:

In the Claims

Column 23, Line 57, Claim 10, delete "$H_{P_1}$ and are $H_{P_2}$" and insert -- $H_{P_1}$ and $H_{P_2}$ are --.

Column 24, Line 53, Claim 15, before "from" insert -- i --.

Column 24, Line 65, Claim 16, after "impact" insert -- i --.

Signed and Sealed this
Thirteenth Day of February, 2024

Katherine Kelly Vidal
*Director of the United States Patent and Trademark Office*